(12) United States Patent
Fujita et al.

(10) Patent No.: US 11,235,277 B2
(45) Date of Patent: Feb. 1, 2022

(54) CARBON DIOXIDE CAPTURE SYSTEM AND METHOD OF OPERATING CARBON DIOXIDE CAPTURE SYSTEM

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Koshito Fujita, Yokohama (JP); Hideo Kitamura, Katsushika (JP); Daigo Muraoka, Kawasaki (JP); Mitsuru Udatsu, Kawasaki (JP); Yusuke Handa, Ota (JP); Tetsuya Kaseda, Kawasaki (JP); Yasuhiro Kato, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 335 days.

(21) Appl. No.: 16/258,769

(22) Filed: Jan. 28, 2019

(65) Prior Publication Data
US 2019/0232215 A1    Aug. 1, 2019

(30) Foreign Application Priority Data

Jan. 30, 2018 (JP) .............................. JP2018-013990

(51) Int. Cl.
*B01D 53/14* (2006.01)
*B01D 53/78* (2006.01)

(52) U.S. Cl.
CPC ......... *B01D 53/1475* (2013.01); *B01D 53/78* (2013.01); *B01D 2252/204* (2013.01); *B01D 2257/504* (2013.01); *B01D 2258/0283* (2013.01)

(58) Field of Classification Search
CPC ................ B01D 53/1475; B01D 53/78; B01D 2252/204; B01D 2257/504; B01D 2258/0283
USPC ...................................................... 423/240 S
See application file for complete search history.

(56) References Cited

U.S. PATENT DOCUMENTS

| | | | |
|---|---|---|---|
| 6,883,327 B2 | 4/2005 | Iijima et al. | |
| 8,679,431 B2 | 3/2014 | Nagayasu et al. | |
| 8,871,164 B2 | 10/2014 | Nagayasu et al. | |
| 10,065,149 B2 | 9/2018 | Tanaka et al. | |
| 2013/0269525 A1* | 10/2013 | Alix | B01D 53/1425 95/159 |
| 2016/0151742 A1 | 6/2016 | Fujita et al. | |

FOREIGN PATENT DOCUMENTS

| | | |
|---|---|---|
| CN | 105642075 A | 6/2016 |
| EP | 2 514 509 B1 | 3/2016 |
| JP | 2004-323339 | 11/2004 |

(Continued)

*Primary Examiner* — Anita Nassiri-Motlagh
(74) *Attorney, Agent, or Firm* — Oblon, McClelland, Maier & Neustadt, L.L.P.

(57) ABSTRACT

A carbon dioxide capture system according to an embodiment includes a carbon dioxide capturer, a first washer, and a second washer. The first washer includes a spray configured to spray first cleaning liquid supplied under first pressure. The second washer includes a cleaning liquid diffuser configured to diffuse and drop second cleaning liquid supplied under second pressure lower than the first pressure.

6 Claims, 9 Drawing Sheets

(56) References Cited

FOREIGN PATENT DOCUMENTS

| | | |
|---|---|---|
| JP | 4274846 | 6/2009 |
| JP | 2015-144980 A | 8/2015 |
| JP | 2016-107162 | 6/2016 |
| JP | 2016-131917 A | 7/2016 |
| JP | 6045652 | 12/2016 |
| JP | 6045654 | 12/2016 |

* cited by examiner

CARBON DIOXIDE CAPTURE SYSTEM AND METHOD OF OPERATING CARBON DIOXIDE CAPTURE SYSTEM

CROSS-REFERENCE TO RELATED APPLICATIONS

This application is based upon and claims the benefit of priority from Japanese Patent Application No. 2018-013990, filed Jan. 30, 2018; the entire contents of which are incorporated herein by reference.

FIELD

Embodiments of the present invention relate to a carbon dioxide capture system and a method of operating the carbon dioxide capture system.

BACKGROUND

In recent years, the greenhouse effect of carbon dioxide in combustion exhaust gas generated upon combustion of fossil fuels has been one of major causes of global warming.

Under such a circumstance, the study has been in progress on a carbon dioxide capture system that prevents the release into the air of carbon dioxide contained in combustion exhaust gas generated upon the combustion of a fossil fuel at thermal plants or other facilities where a large amount of the fossil fuel is consumed. Such a carbon dioxide capture system, after bringing the combustion exhaust gas into contact with an amine absorbing liquid, separates the carbon dioxide from the combustion exhaust gas and captures the separated carbon dioxide.

Specifically, the carbon dioxide capture system includes an absorption column and a regeneration column. The absorption column causes the carbon dioxide contained in the combustion exhaust gas to be absorbed in the amine absorbing liquid. The regeneration column heats the absorbing liquid (rich liquid) containing the absorbed carbon dioxide and supplied from the absorption column, causes the carbon dioxide to be released from the rich liquid, and regenerates the absorbing liquid. The regeneration column is coupled to a reboiler configured to supply a heating source, and the rich liquid is heated within the regeneration column. The absorbing liquid (lean liquid) regenerated in the regeneration column is supplied to the absorption column. The absorbing liquid circulates within the system.

In the carbon dioxide capture system, however, the combustion exhaust gas (decarbonated combustion exhaust gas) from which the carbon dioxide is absorbed in the amine absorbing liquid in the absorption column entrains amine when released into the air from the absorption column. Since a large amount of the combustion exhaust gas is discharged from the thermal plant or other facilities, a large amount of an amino group-containing component (amine) may be released being entrained by the decarbonated combustion exhaust gas. Thus, when the carbon dioxide capture system is used in the thermal plant, it is desirable to efficiently reduce the amount of the amine entrained by the decarbonated combustion exhaust gas in the absorption column and released into the air.

DETAILED DESCRIPTION

A carbon dioxide capture system according to an embodiment includes: a carbon dioxide capturer configured to cause carbon dioxide contained in combustion exhaust gas to be absorbed by absorbing liquid containing amine; a first washer configured to clean the combustion exhaust gas discharged from the carbon dioxide capturer by using first cleaning liquid to capture the amine entrained by the combustion exhaust gas; and a second washer configured to clean the combustion exhaust gas discharged from the carbon dioxide capturer by using second cleaning liquid to capture the amine entrained by the combustion exhaust gas. The first washer includes a spray configured to spray the first cleaning liquid supplied under first pressure. The second washer includes a cleaning liquid diffuser configured to diffuse and drop second cleaning liquid supplied under second pressure lower than the first pressure.

A method of operating the carbon dioxide capture system according to the embodiment includes: causing carbon dioxide contained in combustion exhaust gas to be absorbed by absorbing liquid containing amine in a carbon dioxide capturer; cleaning the combustion exhaust gas discharged from the carbon dioxide capturer by using first cleaning liquid supplied under first pressure in a first washer to capture the amine entrained by the combustion exhaust gas; and cleaning the combustion exhaust gas discharged from the carbon dioxide capturer by using second cleaning liquid supplied under second pressure lower than the first pressure in a second washer to capture the amine entrained by the combustion exhaust gas.

The following describes a carbon dioxide capture system and a method of operating the carbon dioxide capture system according to embodiments of the present invention with reference to the accompanying drawings.

First Embodiment

Figure 1:
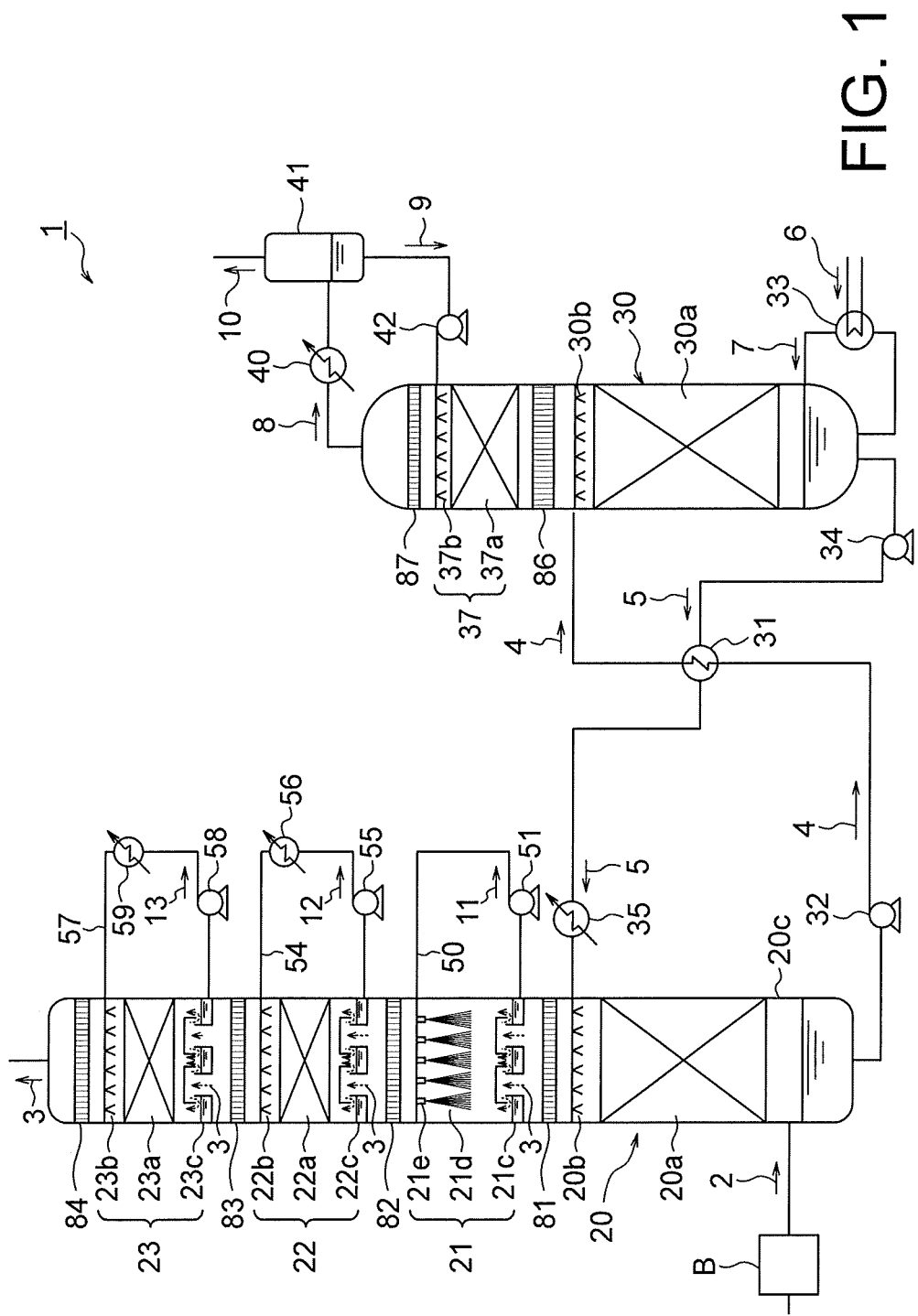
FIG. 1 is a diagram illustrating the entire configuration of a carbon dioxide capture system according to a first embodiment of the present invention.
Figure 2:
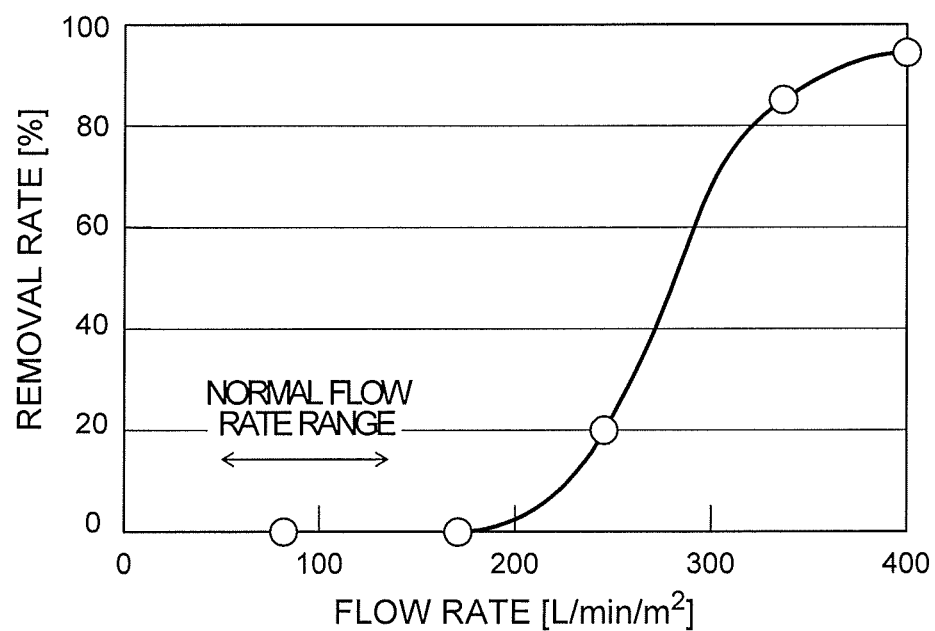
FIG. 2 is a graph illustrating the relation between the flow rate of cleaning liquid and the efficiency of capturing mist amine in the carbon dioxide capture system illustrated in FIG. 1.

The following description is first made on a carbon dioxide capture system and a method of operating the carbon dioxide capture system according to a first embodiment of the present invention with reference to FIGS. 1 and 2.

As illustrated in FIG. 1, a carbon dioxide capture system 1 includes an absorption column 20 configured to cause carbon dioxide contained in combustion exhaust gas 2 to be absorbed by absorbing liquid containing amine, and a regeneration column 30 configured to regenerate the absorbing liquid having absorbed the carbon dioxide and supplied from the absorption column 20 by releasing the carbon dioxide from the absorbing liquid. The combustion exhaust gas 2 having the carbon dioxide absorbed by the absorbing liquid in the absorption column 20 is discharged from the absorption column 20 as decarbonated combustion exhaust gas 3 (to be described later). The carbon dioxide together with steam is discharged as carbon dioxide-containing gas 8 (carbon dioxide-containing steam) from the regeneration column 30. The combustion exhaust gas 2 supplied to the absorption column 20 is not particularly limited but may be, for example, combustion exhaust gas from a boiler (not illustrated) at a thermal plant or process exhaust gas. Such gas may be supplied to the absorption column 20 after provided with cooling processing as necessary.

The absorbing liquid circulates through the absorption column 20 and the regeneration column 30. The absorbing liquid absorbs carbon dioxide and becomes rich liquid 4 at the absorption column 20, and releases the carbon dioxide and becomes lean liquid 5 at the regeneration column 30. The absorbing liquid is not particularly limited but may be, for example, alcoholic hydroxyl group-containing primary amine such as monoethanolamine and 2-amino-2-methyl-1-propanol, alcoholic hydroxyl group-containing secondary amine such as diethanolamine and 2-methylaminoethanol, alcoholic hydroxyl group-containing tertiary amine such as triethanolamine and N-methyldiethanolamine, polyethylene polyamine such as ethylenediamine, triethylenediamine, and diethylenetriamine, piperazine, piperidine, cyclic amine such as pyrrolidine, polyamine such as xylylenediamine, amino acid such as methylaminocarboxylic acid, and their composites. These amine compounds are normally used as water solution of 10 to 70 wt %. The absorbing liquid may contain additions of a carbon dioxide absorption promoter or a corrosion inhibitor, and other media such as methanol, polyethylene glycol, and sulfolane.

The absorption column 20 includes a carbon dioxide capturer 20a (packed bed or shelf; hereinafter referred to as packed bed or the like), a liquid diffuser 20b provided above the carbon dioxide capturer 20a, and an absorption column container 20c housing the carbon dioxide capturer 20a and the liquid diffuser 20b.

The carbon dioxide capturer 20a is configured as a countercurrent gas-liquid contact device. Specifically, the carbon dioxide capturer 20a is made of, for example, a packed bed or the like. In the carbon dioxide capturer 20a, the lean liquid 5 supplied from the regeneration column 30 flows down the surface of an internal structure provided to increase gas-liquid contact interfaces of fillers, particles, and the like filling the structure, and the carbon dioxide is absorbed by the lean liquid 5 through gas-liquid contact with carbon dioxide contained in the combustion exhaust gas 2. In other words, the carbon dioxide is captured (or removed) from the combustion exhaust gas 2. The liquid diffuser 20b diffuses and drops the lean liquid 5 toward the carbon dioxide capturer 20a, thereby supplying the lean liquid 5 to the surface of the carbon dioxide capturer 20a. The pressure of the lean liquid 5 supplied to the liquid diffuser 20b is not so much higher than the pressure in the absorption column 20, and the liquid diffuser 20b drops the lean liquid 5 to the carbon dioxide capturer 20a not forcibly but mainly through the effect of gravitational force. The absorption column container 20c houses a first washer 21, a second washer 22, a third washer 23, and demisters 81, 82, 83, and 84 to be described later in addition to the carbon dioxide capturer 20a and the liquid diffuser 20b. The absorption column container 20c receives the combustion exhaust gas 2 from a lower part of the absorption column container 20c, and discharges the combustion exhaust gas 2 as the decarbonated combustion exhaust gas 3 to be described later from a top part of the absorption column container 20c.

The combustion exhaust gas 2 containing carbon dioxide discharged from the outside of the carbon dioxide capture system 1 such as a boiler described above is supplied to a lower part of the absorption column 20 by a blower B. The supplied combustion exhaust gas 2 moves up in the absorption column 20 toward the carbon dioxide capturer 20a. The lean liquid 5 from the regeneration column 30 is supplied to the liquid diffuser 20b and drops. The lean liquid 5 is then supplied to the carbon dioxide capturer 20a and flows down the surface thereof. In the carbon dioxide capturer 20a, the carbon dioxide contained in the combustion exhaust gas 2 is absorbed by the lean liquid 5 through gas-liquid contact between the combustion exhaust gas 2 and the lean liquid 5, and accordingly the rich liquid 4 is generated.

The generated rich liquid 4 is temporarily accumulated at the lower part of the absorption column container 20c and then discharged from the lower part. The combustion exhaust gas 2 from which the carbon dioxide has been captured through the gas-liquid contact with the lean liquid 5 further moves up in the absorption column 20 from the carbon dioxide capturer 20a as the decarbonated combustion exhaust gas 3.

A heat exchanger 31 is provided between the absorption column 20 and the regeneration column 30. A rich liquid pump 32 is provided between the absorption column 20 and the heat exchanger 31. The rich liquid 4 discharged from the absorption column 20 is supplied to the regeneration column 30 through the heat exchanger 31 by the rich liquid pump 32. The heat exchanger 31 performs heat exchange between the rich liquid 4 supplied from the absorption column 20 to the regeneration column 30 and the lean liquid 5 supplied from the regeneration column 30 to the absorption column 20. Accordingly, the rich liquid 4 is heated to a desired temperature by the lean liquid 5 as a heat source. In other words, the lean liquid 5 is cooled to a desired temperature by the rich liquid 4 as a cooling source.

The regeneration column 30 includes an amine regenerator 30a (packed bed or the like), a liquid diffuser 30b provided above the amine regenerator 30a, and a regeneration column container 30c housing the amine regenerator 30a and the liquid diffuser 30b. The amine regenerator 30a is configured as a countercurrent gas-liquid contact device. Specifically, the amine regenerator 30a is made of, for example, a packed bed or the like. In the amine regenerator 30a, the rich liquid 4 supplied from the absorption column 20 flows down the surface of an internal structure provided to increase gas-liquid contact interfaces of fillers, particles, and the like filling the structure, while carbon dioxide is released from the rich liquid 4 through gas-liquid contact with steam 7 to be described later. The pressure of the rich liquid 4 supplied to the liquid diffuser 30b is not so much higher than the pressure in the regeneration column 30, and the liquid diffuser 30b diffuses and drops the rich liquid 4 toward the amine regenerator 30a to supply the rich liquid 4 to the surface of the amine regenerator 30a. Since the pressure of the rich liquid 4 supplied to the liquid diffuser 30b is not high, the liquid diffuser 30b drops the rich liquid 4 to the amine regenerator 30a substantially not forcibly but mainly through the effect of gravitational force. The regeneration column container 30c houses a regeneration column washer 37 and demisters 86 and 87 to be described later in addition to the amine regenerator 30a and the liquid diffuser 30b. The regeneration column container 30c discharges, from a top part of the regeneration column container 30c, the carbon dioxide-containing gas 8 released from the rich liquid 4.

The regeneration column 30 is connected to a reboiler 33. The reboiler 33 generates the steam 7 by heating, through a heating medium 6, the lean liquid 5 supplied from the regeneration column 30, and supplies the generated steam 7 to the regeneration column 30. More specifically, the reboiler 33 is supplied with part of the lean liquid 5 discharged from a lower part of the regeneration column 30, and is also supplied with high-temperature steam as the heating medium 6 from the outside such as a turbine (not illustrated). The lean liquid 5 supplied to the reboiler 33 is heated through heat exchange with the heating medium 6 so that the steam 7 is generated from the lean liquid 5. The generated steam 7 is supplied to the lower part of the regeneration column 30 to heat the lean liquid 5 in the regeneration column 30. The heating medium 6 is not limited to high-temperature steam from a turbine.

The steam 7 is supplied from the reboiler 33 to the lower part of the regeneration column 30 and moves up in the regeneration column 30 toward the amine regenerator 30a. The rich liquid 4 from the absorption column 20 is supplied to the liquid diffuser 30b and drops. The rich liquid 4 is then supplied to the amine regenerator 30a and flows down the surface thereof. In the amine regenerator 30a, carbon dioxide gas is released from the rich liquid 4 through gas-liquid contact between the rich liquid 4 and the steam 7, and accordingly the lean liquid 5 is generated. In this manner, the absorbing liquid is regenerated at the regeneration column 30.

The generated lean liquid 5 is discharged from the lower part of the regeneration column 30, and the steam 7 subjected to gas-liquid contact with the rich liquid 4 and containing carbon dioxide is discharged as the carbon dioxide-containing gas 8 from a top part of the regeneration column 30. The discharged carbon dioxide-containing gas 8 contains steam.

A lean liquid pump 34 is provided between the regeneration column 30 and the heat exchanger 31. The lean liquid 5 discharged from the regeneration column 30 is supplied to the absorption column 20 through the heat exchanger 31 described above by the lean liquid pump 34. As described above, the heat exchanger 31 cools the lean liquid 5 supplied from the regeneration column 30 to the absorption column 20 through heat exchange with the rich liquid 4 supplied from the absorption column 20 to the regeneration column 30. In addition, a lean liquid cooler 35 is provided between the heat exchanger 31 and the absorption column 20. The lean liquid cooler 35 is supplied with a cooling medium such as cooling water (for example, cooling water of a cooling tower or seawater) from the outside, and further cools, to a desired temperature, the lean liquid 5 cooled at the heat exchanger 31.

The lean liquid 5 cooled at the lean liquid cooler 35 is supplied to the liquid diffuser 20b of the absorption column 20 and drops. The lean liquid 5 is then supplied to the carbon dioxide capturer 20a and flows down the surface thereof. In the carbon dioxide capturer 20a, the lean liquid 5 absorbs carbon dioxide contained in the combustion exhaust gas 2 through gas-liquid contact with the combustion exhaust gas 2 and becomes the rich liquid 4. In this manner, the absorbing liquid circulates in the carbon dioxide capture system 1 while repeatedly becoming the lean liquid 5 and becoming the rich liquid 4.

The carbon dioxide capture system 1 illustrated in FIG. 1 further includes a gas cooler 40 configured to condense steam and generate condensed water 9 by cooling the carbon dioxide-containing gas 8 discharged from the top part of the regeneration column 30, and a gas-liquid separator 41 configured to separate the condensed water 9 generated by the gas cooler 40 from the carbon dioxide-containing gas 8. In this manner, water contained in the carbon dioxide-containing gas 8 is reduced so that the carbon dioxide-containing gas 8 is discharged as carbon dioxide gas 10 from the gas-liquid separator 41 and supplied to and stored in a facility (not illustrated). The condensed water 9 separated at the gas-liquid separator 41 is supplied to the regeneration column 30 by a condensed water pump 42 and mixed into the absorbing liquid. The gas cooler 40 is supplied, from the outside, with a cooling medium (for example, cooling water of a cooling tower or seawater) for cooling the carbon dioxide-containing gas 8.

The absorption column 20 includes the first washer 21, the second washer 22, and the third washer 23. Among these washers, the first washer 21 cleans the decarbonated combustion exhaust gas 3 discharged from the carbon dioxide capturer 20a by using first cleaning liquid 11 (first cleaning water) to capture amine as an absorbing liquid component entrained by the decarbonated combustion exhaust gas 3. The second washer 22 cleans the decarbonated combustion exhaust gas 3 discharged from the first washer 21 by using second cleaning liquid 12 (second cleaning water) to capture amine entrained by the decarbonated combustion exhaust gas 3. The third washer 23 cleans the decarbonated combustion exhaust gas 3 discharged from the second washer 22 by using third cleaning liquid 13 (third cleaning water) to capture amine entrained by the decarbonated combustion exhaust gas 3. The first washer 21 is provided above the liquid diffuser 20b, the second washer 22 is provided above the first washer 21, and the third washer 23 is provided above the second washer 22.

The first washer 21 includes a first capture space 21d, a first spray 21e provided above the first capture space 21d, and a first receiver 21c provided below the first capture space 21d, In the first capture space 21d, the first cleaning liquid 11 supplied under first pressure and sprayed by the first spray 21e is subjected to gas-liquid contact with the decarbonated combustion exhaust gas 3 having passed through the first receiver 21c and moving up, while freely falling (in other words, falls without contacting the surface of a structure or the like in the space) in the state of mist. In the space, amine entrained by the decarbonated combustion exhaust gas 3 (mainly, mist amine and mist of the absorbing liquid) is captured. The first capture space 21d extends from the first spray 21e to the first receiver 21c.

In the present embodiment, no structure such as a packed bed or a shelf in which the first cleaning liquid 11 contacts the decarbonated combustion exhaust gas 3 while flowing down the surface thereof is provided between the first spray 21e and the first receiver 21c. In other words, no member such as a structure having a surface that the first cleaning liquid 11 flows down is provided between the first spray 21e and the first receiver 21c, but the first capture space 21d extends therebetween to allow the first cleaning liquid 11 to have gas-liquid contact with the decarbonated combustion exhaust gas 3 while freely falling. Mist of the first cleaning liquid 11 sprayed by the first spray 21e drops in the first capture space 21*d* in which the decarbonated combustion exhaust gas 3 moves up, and directly reaches the first receiver 21*c*. In other words, the first cleaning liquid 11 having passed through the first capture space 21*d* is directly received by the first receiver 21*c*. While dropping, the first cleaning liquid 11 contacts the decarbonated combustion exhaust gas 3, collides with mist amine entrained by the decarbonated combustion exhaust gas 3, and captures the mist amine.

The first spray 21*e* sprays and drops, toward the first capture space 21*d*, the first cleaning liquid 11 supplied under the first pressure. The first spray 21*e* includes a plurality of spray nozzle holes (not illustrated). The first cleaning liquid 11, the pressure of which is increased by a first circulation pump 51 to be described later and that is supplied under the first pressure is injected (sprayed) through the spray nozzle holes. Accordingly, the first cleaning liquid 11 is sprayed fast as mist from the first spray 21*e* and freely falls while equally spreading across the first capture space 21*d*. Specifically, the first spray 21*e* provides a first vertical direction initial velocity as a velocity component in the vertical direction to the first cleaning liquid 11 and forcibly freely falls (sprays) the first cleaning liquid 11 at the velocity component in the vertical direction in the first capture space 21*d*.

The first receiver 21*c* receives and accumulates the first cleaning liquid 11 falling through the first capture space 21*d*, and allows passing of the decarbonated combustion exhaust gas 3 discharged from the carbon dioxide capturer 20*a* and moving up. Specifically, the first receiver 21*c* includes a receiver body configured to receive and accumulate the first cleaning liquid 11, an opening that is provided in the receiver body and through which the decarbonated combustion exhaust gas 3 passes, and a cover covering the opening from above to prevent the first cleaning liquid 11 from passing through the opening.

The first washer 21 is connected to a first circulation line 50 through which the first cleaning liquid 11 circulates. Specifically, the first circulation line 50 is provided with the first circulation pump 51. The first circulation pump 51 pumps out the first cleaning liquid 11 accumulated at the first receiver 21*c* and supplies the first cleaning liquid 11 under the first pressure to the first spray 21*e*, thereby circulating the first cleaning liquid 11.

The second washer 22 includes a second capturer 22*a* (packed bed or the like), a second cleaning liquid diffuser 22*b* provided above the second capturer 22*a*, and a second receiver 22*c* provided below the second capturer 22*a*.

The second capturer 22*a* is configured as a countercurrent gas-liquid contact device. Specifically, the second capturer 22*a* is made of, for example, a packed bed or the like. In the second capturer 22*a*, the second cleaning liquid 12 flows down the surface of an internal structure provided to increase gas-liquid contact interfaces of fillers, particles, and the like filling the structure, while capturing amine entrained by the decarbonated combustion exhaust gas 3 (mainly, gas amine) through gas-liquid contact with the decarbonated combustion exhaust gas 3 to remove the amine from the decarbonated combustion exhaust gas 3. The second cleaning liquid diffuser 22*b* diffuses and drops, toward the second capturer 22*a*, the second cleaning liquid 12 supplied under second pressure. In this manner, the second cleaning liquid diffuser 22*b* supplies the second cleaning liquid 12 so that the second cleaning liquid 12 flows down the surface of a structure inside the second capturer 22*a*. The second pressure is lower than the first pressure as the pressure of the first cleaning liquid 11 supplied to the first spray 21*e* of the first washer 21. The pressure (second pressure) of the second cleaning liquid 12 supplied to the second cleaning liquid diffuser 22*b* is not so much higher than the pressure in the absorption column 20. A second vertical direction initial velocity as a velocity component in the vertical direction provided to the second cleaning liquid 12 diffused by the second cleaning liquid diffuser 22*b* is smaller than the first vertical direction initial velocity as the velocity component in the vertical direction provided to the first cleaning liquid 11 by the first spray 21*e* of the first washer 21. The second vertical direction initial velocity as the velocity component in the vertical direction provided to the second cleaning liquid 12 is substantially 0 (zero), and the second cleaning liquid diffuser 22*b* non-forcibly freely falls the second cleaning liquid 12 to the second capturer 22*a* through the effect of gravitational force. The second receiver 22*c* receives and accumulates the second cleaning liquid 12 flowing down the surface of an internal structure in the second capturer 22*a*, and allows passing of the decarbonated combustion exhaust gas 3 discharged from the first capture space 21*d* of the first washer 21 and moving up. The second receiver 22*c* has a configuration same as that of the first receiver 21*c*.

The second washer 22 is connected to a second circulation line 54 through which the second cleaning liquid 12 circulates. Specifically, the second circulation line 54 is provided with a second circulation pump 55. The second circulation pump 55 pumps out the second cleaning liquid 12 accumulated at the second receiver 22*c* and supplies the second cleaning liquid 12 to the second cleaning liquid diffuser 22*b*, thereby circulating the second cleaning liquid 12.

In the present embodiment, the second circulation line 54 is provided with a second cleaning liquid cooler 56 configured to cool the second cleaning liquid 12. The second cleaning liquid cooler 56 is supplied with, as a cooling medium for cooling the second cleaning liquid 12, a cooling medium (for example, cooling water of a cooling tower or seawater) from the outside of the carbon dioxide capture system 1. In this manner, the second cleaning liquid cooler 56 cools the second cleaning liquid 12 flowing through the second circulation line 54 so that the temperature of the second cleaning liquid 12 becomes lower than the temperature of the first cleaning liquid 11. The temperature of the second cleaning liquid 12 and the temperature of the first cleaning liquid 11 may be substantially equal to each other.

The third washer 23 includes a third capturer 23*a* (packed bed or the like), a third cleaning liquid diffuser 23*b* provided above the third capturer 23*a*, and a third receiver 23*c* provided below the third capturer 23*a*.

The third capturer 23*a* is configured as a countercurrent gas-liquid contact device. Specifically, the third capturer 23*a* is made of, for example, a packed bed or the like. In the third capturer 23*a*, the third cleaning liquid 13 flows down the surface of an internal structure provided to increase gas-liquid contact interfaces of fillers, particles, and the like filling the structure, while capturing amine entrained by the decarbonated combustion exhaust gas 3 (mainly, gas amine) through gas-liquid contact with the decarbonated combustion exhaust gas 3 to remove the amine from the decarbonated combustion exhaust gas 3. The third cleaning liquid diffuser 23*b* diffuses and drops, toward the third capturer 23*a*, the third cleaning liquid 13 supplied under third pressure. In this manner, the third cleaning liquid diffuser 23*b* supplies the third cleaning liquid 13 so that the third cleaning liquid 13 flows down the surface of a structure inside the third capturer 23*a*. The third pressure is lower than the first pressure as the pressure of the first cleaning liquid 11 supplied to the first spray 21*e* of the first washer 21. The pressure (third pressure) of the third cleaning liquid 13 supplied to the third cleaning liquid diffuser 23b is not so much higher than the pressure in the absorption column 20. A third vertical direction initial velocity as a velocity component in the vertical direction provided to the third cleaning liquid 13 diffused by the third cleaning liquid diffuser 23b is smaller than the first vertical direction initial velocity as the velocity component in the vertical direction provided to the first cleaning liquid 11 by the first spray 21e of the first washer 21. The third vertical direction initial velocity as the velocity component in the vertical direction provided to the third cleaning liquid 13 is substantially 0 (zero), and the third cleaning liquid diffuser 23b non-forcibly freely falls the third cleaning liquid 13 to the third capturer 23a through the effect of gravitational force. The third receiver 23c receives and accumulates the third cleaning liquid 13 flowing down the surface of an internal structure in the third capturer 23a, and allows passing of the decarbonated combustion exhaust gas 3 discharged from the second capturer 22a of the second washer 22 and moving up. The third receiver 23c has a configuration same as those of the first receiver 21c and the second receiver 22c. The third pressure as the pressure of the third cleaning liquid 13 supplied to the third cleaning liquid diffuser 23b can be made equal to, for example, the second pressure as the pressure of the second cleaning liquid 12 supplied to the second cleaning liquid diffuser 22b. Similarly, the third vertical direction initial velocity as the velocity component in the vertical direction provided to the third cleaning liquid 13 diffused by the third cleaning liquid diffuser 23b can be made equal to the second vertical direction initial velocity as the velocity component in the vertical direction provided to the second cleaning liquid 12 diffused by the second cleaning liquid diffuser 22b.

The third washer 23 is connected to a third circulation line 57 through which the third cleaning liquid 13 circulates. Specifically, the third circulation line 57 is provided with a third circulation pump 58. The third circulation pump 58 pumps out the third cleaning liquid 13 accumulated at the third receiver 23c and supplies the third cleaning liquid 13 to the third cleaning liquid diffuser 23b, thereby circulating the third cleaning liquid 13.

In the present embodiment, the third circulation line 57 is provided with a third cleaning liquid cooler 59 configured to cool the third cleaning liquid 13. The third cleaning liquid cooler 59 is supplied with, as a cooling medium for cooling the third cleaning liquid 13, a cooling medium (for example, cooling water of a cooling tower or seawater) from the outside of the carbon dioxide capture system 1. In this manner, the third cleaning liquid cooler 59 cools the third cleaning liquid 13 flowing through the third circulation line 57.

The flow rate (first flow rate) of the first cleaning liquid 11 sprayed by the first spray 21e of the first washer 21 per unit area and unit time is larger than the flow rate (second flow rate) of the second cleaning liquid 12 diffused by the second cleaning liquid diffuser 22b of the second washer 22 per unit area and unit time, and is also larger than the flow rate (third flow rate) of the third cleaning liquid 13 diffused by the third cleaning liquid diffuser 23b of the third washer 23 per unit area and unit time. The flow rate of the first cleaning liquid 11 sprayed by the first spray 21e is adjusted by the first circulation pump 51 (flow rate adjuster) described above. Similarly, the flow rate of the second cleaning liquid 12 diffused by the second cleaning liquid diffuser 22b is adjusted by the second circulation pump 55 described above, and the flow rate of the third cleaning liquid 13 diffused by the third cleaning liquid diffuser 23b is adjusted by the third circulation pump 58 described above.

The above-described unit areas are unit areas of a horizontal cross-sectional area (or horizontal cross-sectional area of the first washer 21) in which the first spray 21e sprays the first cleaning liquid 11, a horizontal cross-sectional area (or horizontal cross-sectional area of the second washer 22) in which the second cleaning liquid diffuser 22b diffuses the second cleaning liquid 12, and a horizontal cross-sectional area (or horizontal cross-sectional area of the third washer 23) in which the third cleaning liquid diffuser 23b diffuses the third cleaning liquid 13. In the present embodiment, the horizontal cross-sectional areas of the first washer 21, the second washer 22, and the third washer 23 are substantially equal to each other. Thus, the first flow rate, the second flow rate, and the third flow rate may be set to be flow rates per unit time, ignoring the difference among the horizontal cross-sectional areas of the washers (the first washer 21, the second washer 22, and the third washer 23).

In generalization including a case in which the horizontal cross-sectional areas of the washers 21 to 23 are different from each other, for example, the flow rate (first flow rate) of the first cleaning liquid 11 sprayed by the first spray 21e per unit area and unit time may be equal to or higher than 300 L/min/m$^2$, and the flow rate (second flow rate) of the second cleaning liquid 12 diffused by the second cleaning liquid diffuser 22b per unit area and unit time and the flow rate (third flow rate) of the third cleaning liquid 13 diffused by the third cleaning liquid diffuser 23b per unit area and unit time may be 50 L/min/m$^2$ to 150 L/min/m$^2$ (a normal flow rate range illustrated in FIG. 2).

The first pressure of the first cleaning liquid 11 supplied to the first spray 21e of the first washer 21 (the pressure in the first spray 21e) is higher than the second pressure of the second cleaning liquid 12 supplied to the second cleaning liquid diffuser 22b of the second washer 22 (the pressure in the second cleaning liquid diffuser 22b), and is also higher than the third pressure of the third cleaning liquid 13 supplied to the third cleaning liquid diffuser 23b of the third washer 23 (the pressure in the third cleaning liquid diffuser 23b). The first pressure of the first cleaning liquid 11 supplied to the first spray 21e is adjusted by the first circulation pump 51 (pressure adjuster) described above. Similarly, the second pressure of the second cleaning liquid 12 supplied to the second cleaning liquid diffuser 22b is adjusted by the second circulation pump 55 described above, and the third pressure of the third cleaning liquid 13 supplied to the third cleaning liquid diffuser 23b is adjusted by the third circulation pump 58 described above. For example, the first pressure of the first cleaning liquid 11 supplied to the first spray 21e may be 0.1 MPa to 0.8 MPa. The second pressure of the second cleaning liquid 12 supplied to the second cleaning liquid diffuser 22b and the third pressure of the third cleaning liquid 13 supplied to the third cleaning liquid diffuser 23b may be equal to or lower than 0.1 MPa. For example, the first pressure, the second pressure, and the third pressure can be set appropriately as described above by setting the discharge pressures of the first circulation pump 51, the second circulation pump 55, and the third circulation pump 58, respectively, with taken into account lifts (heads) up to the first spray 21e, the second cleaning liquid diffuser 22b, and the third cleaning liquid diffuser 23b.

The first cleaning liquid 11 sprayed by the first spray 21e of the first washer 21 preferably has a smaller particle size. This is because, at a constant flow rate, the number of mist droplets can be increased by decreasing the particle size of mist of the first cleaning liquid 11. This increases the probability of physical collision with mist amine entrained by the decarbonated combustion exhaust gas 3. For example, the first cleaning liquid 11 may have a mean particle size of 100 μm to 1000 μm, preferably 200 μm to 800 μm. The above-described spray nozzle holes of the first spray 21e are formed to be capable of producing mist of the first cleaning liquid 11 having such a mean particle size. The mean particle size is the average value of the particle size of the first cleaning liquid 11 sprayed by the first spray 21e. The mean particle size may be defined as appropriate by, instead of the average value of the particle size, the median or a function using the variance, the standard deviation, and the like in addition to the average value and the median.

The capturer exit demister 81 is provided above the carbon dioxide capturer 20a. More specifically, the capturer exit demister 81 is provided between the carbon dioxide capturer 20a and the first washer 21 (between the liquid diffuser 20b and the first receiver 21c). With this configuration, the decarbonated combustion exhaust gas 3 discharged from the carbon dioxide capturer 20a passes through the capturer exit demister 81 and moves up. The capturer exit demister 81 traps mist (mainly, mist amine) entrained by the passing decarbonated combustion exhaust gas 3.

The first washer exit demister 82 is provided above the first washer 21. More specifically, the first washer exit demister 82 is provided between the first washer 21 and the second washer 22 (between the first spray 21e and the second receiver 22c). With this configuration, the decarbonated combustion exhaust gas 3 discharged from the first washer 21 passes through the first washer exit demister 82 and moves up. The first washer exit demister 82 traps mist (mainly, mist amine and mist of the first cleaning liquid 11) entrained by the passing decarbonated combustion exhaust gas 3.

The second washer exit demister 83 is provided above the second washer 22. More specifically, the second washer exit demister 83 is provided between the second washer 22 and the third washer 23 (between the second cleaning liquid diffuser 22b and the third receiver 23c). With this configuration, the decarbonated combustion exhaust gas 3 discharged from the second washer 22 passes through the third washer exit demister 84 and moves up. The second washer exit demister 83 traps mist (mainly, mist amine and mist of the second cleaning liquid 12) entrained by the passing decarbonated combustion exhaust gas 3.

The third washer exit demister 84 is provided above the third washer 23. More specifically, the third washer exit demister 84 is provided above the third cleaning liquid diffuser 23b of the third washer 23 (between the third cleaning liquid diffuser 23b and the top part of the absorption column container 20c). With this configuration, the decarbonated combustion exhaust gas 3 discharged from the third washer 23 passes through the third washer exit demister 84 and moves up. The third washer exit demister 84 traps mist (mainly, mist amine and mist of the third cleaning liquid 13) entrained by the decarbonated combustion exhaust gas 3.

In the present embodiment, the third washer exit demister 84 is formed to be sparser than the second washer exit demister 83.

Sparse or dense formation of a demister can be expressed by, for example, the space ratio of the demister. More specifically, correspondence may be defined between the magnitude of the space ratio of the demister and the sparse or dense formation of the demister. In this case, sparser formation of the third washer exit demister 84 than the second washer exit demister 83 is synonymous with a larger space ratio of the third washer exit demister 84 than that of the second washer exit demister 83. With this configuration, the third washer exit demister 84 has a larger space through which the decarbonated combustion exhaust gas 3 passes, which facilitates the passing of the decarbonated combustion exhaust gas 3. Accordingly, a pressure loss occurring to the flow of the decarbonated combustion exhaust gas 3 can be reduced. For example, when the second washer exit demister 83 and the third washer exit demister 84 have meshes, the mesh of the third washer exit demister 84 may be sparser than the mesh of the second washer exit demister 83. Similarly, the third washer exit demister 84 may be formed to be sparser than the first washer exit demister 82.

Alternatively, the sparse or dense formation of a demister may be expressed based on, for example, a characteristic related to the ratio of mist removal (or capture) by the demister. More specifically, when the characteristic of the demister is expressed by the removal ratio of mist having a predetermined particle size range (for example, 0.1 μm to 10 μm), correspondence may be defined between the magnitude of the removal ratio and the sparse or dense formation of the demister. In this case, sparser formation of the third washer exit demister 84 than the second washer exit demister 83 is synonymous with a smaller removal ratio of the third washer exit demister 84 for mist in the predetermined particle size range than that of the second washer exit demister 83.

In the present embodiment, similarly to the third washer exit demister 84, the capturer exit demister 81 may be formed to be sparser than the first washer exit demister 82 and/or the second washer exit demister 83.

As illustrated in FIG. 1, the regeneration column 30 includes the regeneration column washer 37 configured to clean the carbon dioxide-containing gas 8 discharged from the amine regenerator 30a described above by using the condensed water 9 to capture amine entrained by the carbon dioxide-containing gas 8. The regeneration column washer 37 is provided above the amine regenerator 30a.

The regeneration column washer 37 includes a regeneration column capturer 37a (packed bed or the like), and a liquid diffuser 37b provided above the regeneration column capturer 37a. The regeneration column capturer 37a is configured as a countercurrent gas-liquid contact device. Specifically, the regeneration column capturer 37a is made of, for example, a packed bed or the like. In the regeneration column capturer 37a, the condensed water 9 flows down the surface of an internal structure provided to increase gas-liquid contact interfaces of fillers, particles, and the like filling the structure, while capturing amine from the carbon dioxide-containing gas 8 through gas-liquid contact with the carbon dioxide-containing gas 8. The liquid diffuser 37b diffuses and drops the condensed water 9 toward the regeneration column capturer 37a. In this manner, the liquid diffuser 37b supplies the condensed water 9 to the surface of the regeneration column capturer 37a. The liquid diffuser 37b drops the condensed water 9 not forcibly but through the effect of gravitational force.

The first regeneration column demister 86 is provided above the amine regenerator 30a of the regeneration column 30. More specifically, the first regeneration column demister 86 is provided between the amine regenerator 30a and the regeneration column washer 37 (between the liquid diffuser 30b and the regeneration column capturer 37a). With this configuration, the carbon dioxide-containing gas 8 discharged from the amine regenerator 30a passes through the first regeneration column demister 86 and moves up. The first regeneration column demister 86 traps mist (mainly, mist amine) entrained by the passing carbon dioxide-containing gas 8.

The second regeneration column demister 87 is provided above the regeneration column washer 37. More specifically, the second regeneration column demister 87 is provided above the liquid diffuser 37b of the regeneration column washer 37 (between the liquid diffuser 37b and the top part of the regeneration column container 30c). With this configuration, the carbon dioxide-containing gas 8 discharged from the regeneration column washer 37 passes through the second regeneration column demister 87 and moves up. The second regeneration column demister 87 traps mist amine entrained by the passing carbon dioxide-containing gas 8 and mist of the condensed water 9.

The following describes the effect of the present embodiment thus configured, in other words, the method of operating the carbon dioxide capture system.

While the carbon dioxide capture system illustrated in FIG. 1 is in operation, the lean liquid 5 supplied from the lean liquid cooler 35, in the carbon dioxide capturer 20a of the absorption column 20, diffuses and drops from the liquid diffuser 20b to have gas-liquid contact with the combustion exhaust gas 2 while flowing down the surface of the carbon dioxide capturer 20a. Carbon dioxide contained in the combustion exhaust gas 2 is absorbed by the lean liquid 5. The combustion exhaust gas 2 is discharged as the decarbonated combustion exhaust gas 3 from the carbon dioxide capturer 20a. The discharged decarbonated combustion exhaust gas 3 moves up in the absorption column container 20c and passes through the capturer exit demister 81.

The capturer exit demister 81 mainly traps mist amine having a large particle size in mist amine entrained by the decarbonated combustion exhaust gas 3.

Specifically, the capturer exit demister 81 is directly provided over the liquid diffuser 20b, and is a demister through which the decarbonated combustion exhaust gas 3 discharged from the carbon dioxide capturer 20a first passes. Thus, mist amine having a relatively large particle size is likely to be entrained by the decarbonated combustion exhaust gas 3 passing through the capturer exit demister 81. When such mist amine having a large particle size reaches the first washer 21, the amine concentration of the first cleaning liquid 11 increases, which potentially largely degrades the cleaning performance of the first cleaning liquid 11. For this reason, the capturer exit demister 81 is provided to capture mist amine having a large particle size. To achieve this, the capturer exit demister 81 is sparsely formed as described above. In this case, a pressure loss occurring to the flow of the decarbonated combustion exhaust gas 3 passing through the capturer exit demister 81 can be reduced.

The decarbonated combustion exhaust gas 3 having passed through the capturer exit demister 81 passes through the first receiver 21c of the first washer 21 and reaches the first capture space 21d.

The first cleaning liquid 11 accumulated at the first receiver 21c is pumped out of the first receiver 21c by the first circulation pump 51 and supplied to the first spray 21e through the first circulation line 50 under the first pressure higher than the second pressure and the third pressure. In the present embodiment, since the first circulation line 50 is provided with, for example, no heaters 52 and 53 (refer to FIGS. 3 and 4) to be described later nor cooler, the first cleaning liquid 11 passing through the first circulation line 50 is not actively heated nor cooled.

The first cleaning liquid 11 is sprayed from the spray nozzle holes of the first spray 21e, drops in the first capture space 21d, and directly reaches the first receiver 21c. During this process, while dropping in the state of mist, the first cleaning liquid 11 is subjected to gas-liquid contact with the decarbonated combustion exhaust gas 3 so that the decarbonated combustion exhaust gas 3 is cleaned by the first cleaning liquid 11. Accordingly, mainly mist amine entrained by the decarbonated combustion exhaust gas 3 is captured by the first cleaning liquid 11. The first cleaning liquid 11 having reached the first receiver 21c is received by and accumulated at the first receiver 21c.

The following describes a typical problem that occurs when the decarbonated combustion exhaust gas 3 is cleaned in the carbon dioxide capture system 1.

Typically, the carbon dioxide capture system 1 is provided with a packed bed or shelf, the surface of which cleaning liquid flows down to capture amine entrained by the decarbonated combustion exhaust gas 3 in some cases. In such a case, the decarbonated combustion exhaust gas 3 and the cleaning liquid have an increased contact interface therebetween to efficiently capture amine.

Amine entrained by the decarbonated combustion exhaust gas 3 is roughly classified into gas amine and mist amine. The gas amine is likely to be captured by cleaning with cleaning liquid and a packed bed or the like. However, the mist amine is unlikely to be captured by cleaning with cleaning liquid and a packed bed or the like. The mist amine is likely to be trapped by a demister, but mist amine having a particle size of 5 µm or smaller is unlikely to be trapped by the demister.

Thus, in the present embodiment, the efficiency of capturing mist amine is improved by spraying cleaning liquid into mist. Specifically, in the present embodiment, the pressure of the first cleaning liquid 11 supplied to the first spray 21e of the first washer 21 is increased to spray the first cleaning liquid 11 from the spray nozzle holes of the first spray 21e at high speed (particularly right after injection). With this configuration, mist of the first cleaning liquid 11 physically collides with mist amine entrained by the decarbonated combustion exhaust gas 3, and the mist amine is trapped by the mist of the first cleaning liquid 11 and captured. The first cleaning liquid 11 having captured the mist amine drops to the first receiver 21c. In this manner, the mist amine, which is unlikely to be trapped by cleaning with cleaning liquid and a packed bed or the like, is captured by the first cleaning liquid 11, and the decarbonated combustion exhaust gas 3 is efficiently cleaned.

As described above, the first cleaning liquid 11 sprayed by the first spray 21e freely falls in the first capture space 21d in which a packed bed or the like is not provided, without contacting the surface of a structure or the like. In this case, mist of the first cleaning liquid 11 directly reaches the first receiver 21c without colliding with a member such as a structure, which prevents refinement of the mist of the first cleaning liquid 11.

Specifically, when the first washer 21 includes a capturer (first capturer 21a illustrated in FIG. 9 to be described later) made of a packed bed or the like, like the second washer 22 or the third washer 23, mist of the first cleaning liquid 11 sprayed at high speed by the first spray 21e is refined through collision with the packed bed or the like. Accordingly, the particle size of the mist of the first cleaning liquid 11 decreases, and the mist of the first cleaning liquid 11 becomes likely to be entrained by the decarbonated combustion exhaust gas 3. As a result, the first cleaning liquid 11 having captured amine is entrained by the decarbonated combustion exhaust gas 3 and discharged into air, which decreases the cleaning efficiency.

However, in the present embodiment, the first capture space 21d is formed below the first spray 21e and provided with no member such as a structure of a packed bed or the like. This configuration can prevent refinement of mist of the first cleaning liquid 11 and thus decrease of the cleaning efficiency. For example, the first capture space 21d can be sufficiently provided by having a distance of at least 1 m or longer, preferably 1.5 m or longer, from the first spray 21e to the first receiver 21c. With this configuration, mist of the first cleaning liquid 11 can be decelerated when reaching the first receiver 21c, and thus prevented from being refined through collision with the first receiver 21c.

The efficiency of cleaning the decarbonated combustion exhaust gas 3 can be also improved through the spray speed and particle size of mist of the first cleaning liquid 11. Thus, the first pressure of the first cleaning liquid 11 supplied to the first spray 21e is preferably increased to, for example, 0.1 MPa to 0.8 MPa. The spray speed of mist of the first cleaning liquid 11 can be increased by setting the first pressure of the first cleaning liquid 11 to be 0.1 MPa or higher. The particle size of sprayed mist of the first cleaning liquid 11 can be prevented from being broad (having large particle-size distribution) by setting the first pressure of the first cleaning liquid 11 to be 0.8 MPa or lower, thereby stabilizing the cleaning performance. In addition, increase of the capacity (necessary power) of the first circulation pump 51 can be reduced, and thus increase of operation cost can be reduced.

The sprayed first cleaning liquid 11 preferably has a mean particle size of 100 μm to 1000 μm, more preferably 200 μm to 800 μm. The mean particle size of 100 μm or larger can prevent mist of the first cleaning liquid 11 containing amine from being entrained by flow of the decarbonated combustion exhaust gas 3, which would otherwise cause decrease of the cleaning efficiency. The particle size of the first cleaning liquid 11 sprayed by the first spray 21e may be 200 μm or larger to further prevent mist of the first cleaning liquid 11 from being entrained by the decarbonated combustion exhaust gas 3. The particle size of mist of the first cleaning liquid 11 can be reduced by setting the mean particle size to be 1000 μm or smaller, and accordingly, the number of mist droplets of the first cleaning liquid 11 can be increased to have collision with mist amine entrained by the decarbonated combustion exhaust gas 3 at an increased probability. The particle size of the first cleaning liquid 11 sprayed by the first spray 21e may be 800 μm or smaller to further increase the probability of collision with mist amine entrained by the decarbonated combustion exhaust gas 3.

The flow rate (first flow rate) of the first cleaning liquid 11 sprayed by the first spray 21e per unit area and unit time may be 300 L/min/m$^2$ or higher. The flow rate (the second flow rate) of the second cleaning liquid 12 diffused by the second cleaning liquid diffuser 22b of the second washer 22 per unit area and unit time is set to be 50 L/min/m$^2$ to 150 L/min/m$^2$. The flow rate (third flow rate) of the third cleaning liquid 13 per unit area and unit time is set to be in the same range. The second cleaning liquid 12 diffused by the second cleaning liquid diffuser 22b is subjected to gas-liquid contact with the decarbonated combustion exhaust gas 3 while flowing down the surface of the second capturer 22a made of a packed bed or the like. This limits contribution of setting the flow rate of the second cleaning liquid 12 per unit area and unit time to be larger than 150 L/min/m$^2$ to improvement of the efficiency of cleaning the decarbonated combustion exhaust gas 3. Moreover, increasing the flow rate of the second cleaning liquid 12 than needed increases the capacity of the second circulation pump 55 and hence operation cost, and thus is not preferable. However, the first washer 21, which includes no member of a packed bed or the like, subjects the first cleaning liquid 11 sprayed by the first spray 21e in the state of mist to gas-liquid contact with the decarbonated combustion exhaust gas 3. With this configuration, increasing the flow rate of the first cleaning liquid 11 per unit area and unit time contributes to increase of the probability of physical collision with mist amine entrained by the decarbonated combustion exhaust gas 3, and hence increase of the efficiency of cleaning the decarbonated combustion exhaust gas 3. This is illustrated in FIG. 2.

FIG. 2 is a graph illustrating the relation between the flow rate of the first cleaning liquid 11 and the efficiency of capturing mist amine. This data was obtained under a test condition described below.

Test device inner diameter (corresponding to the inner diameter of the absorption column container 20c) . . . 157 mm Treatment gas flow speed (corresponding to the flow speed of the decarbonated combustion exhaust gas 3) . . . 0.7 m/s The concentration of mist amine droplets (particle size of 0.61 μm to 0.95 μm) . . . 10000/cc approximately The mean particle size of cleaning water mist . . . 0.5 mm approximately Spray pressure . . . 0.2 MPa As illustrated in FIG. 2, the capture efficiency is low in the normal flow rate range of the second cleaning liquid 12 and the third cleaning liquid 13 but increases beyond the range. When the flow rate is 300 L/min/m$^2$ or higher, the capture efficiency exceeds 70%, which leads to increase of the efficiency of capturing mist amine.

As described above, amine entrained by the decarbonated combustion exhaust gas 3 is roughly classified into gas amine and mist amine. Typically, the mist amine has a larger ratio as an amine amount. Accordingly, the amine entrained by the decarbonated combustion exhaust gas 3 can be effectively captured when the first cleaning liquid 11, with which the decarbonated combustion exhaust gas 3 discharged from the carbon dioxide capturer 20a is cleaned first, is sprayed by the first spray 21e and captures the mist amine. In this case, the amount of amine entrained by the decarbonated combustion exhaust gas 3 is reduced by the time of cleaning with the second cleaning liquid 12, and further reduced by the time of cleaning with the third cleaning liquid 13. Accordingly, the amine concentration of the second cleaning liquid 12 becomes lower than the amine concentration of the first cleaning liquid 11, and the amine concentration of the third cleaning liquid 13 becomes further lower than the amine concentration of the second cleaning liquid 12.

As illustrated in FIG. 1, the decarbonated combustion exhaust gas 3 cleaned by the first cleaning liquid 11 is discharged from the first capture space 21d of the first washer 21. Then, the decarbonated combustion exhaust gas 3 further moves up in the absorption column container 20c and passes through the first washer exit demister 82.

The first washer exit demister 82 mainly traps mist amine entrained by the decarbonated combustion exhaust gas 3 and mist of the first cleaning liquid 11. The following describes a case of the mist amine. The first washer exit demister 82 is formed to be denser than the capturer exit demister 81. Thus, in gas amine entrained by the decarbonated combustion exhaust gas 3, the mist amine having a large particle size and the mist amine having a small particle size are trapped by the first washer exit demister 82. The mist amine not captured in the first capture space 21*d* is trapped by the first washer exit demister 82.

The decarbonated combustion exhaust gas 3 having passed through the first washer exit demister 82 passes through the second receiver 22*c* of the second washer 22 and reaches the second capturer 22*a*.

The second cleaning liquid 12 accumulated at the second receiver 22*c* is pumped out of the second receiver 22*c* by the second circulation pump 55 and supplied to the second cleaning liquid diffuser 22*b* through the second circulation line 54. During this process, the second cleaning liquid 12 is cooled by the second cleaning liquid cooler 56 so that the temperature of the second cleaning liquid 12 becomes lower than the temperature of the first cleaning liquid 11.

At the second capturer 22*a*, the cooled second cleaning liquid 12 flows down the surface of the second capturer 22*a* while cleaning the decarbonated combustion exhaust gas 3 through gas-liquid contact with the decarbonated combustion exhaust gas 3. With this configuration, mainly, the gas amine entrained by the decarbonated combustion exhaust gas 3 is captured by the second cleaning liquid 12. Having cleaned the decarbonated combustion exhaust gas 3 at the second capturer 22*a*, the second cleaning liquid 12 drops from the second capturer 22*a* and is received by and accumulated at the second receiver 22*c*.

Since the second capturer 22*a* is supplied with the cooled second cleaning liquid 12, the temperature of the second capturer 22*a* becomes lower than the temperature of the first capture space 21*d*. Accordingly, the decarbonated combustion exhaust gas 3 is cooled by the second cleaning liquid 12 so that the temperature of the decarbonated combustion exhaust gas 3 decreases. Water steam entrained by the decarbonated combustion exhaust gas 3 condenses along with the decrease of the temperature of the decarbonated combustion exhaust gas 3, and the condensed water is trapped by the second cleaning liquid 12. Accordingly, the amine concentration of the second cleaning liquid 12 decreases.

The mist amine not captured by the first washer exit demister 82 is supplied to the second capturer 22*a* of the second washer 22 and cooled at the second capturer 22*a*. At the second capturer 22*a*, the condensed water is also trapped by the mist amine. Accordingly, the particle size of the mist amine increases, and the mist amine becomes more likely to be trapped by the second washer exit demister 83 provided above the second capturer 22*a*.

The decarbonated combustion exhaust gas 3 cleaned by the second cleaning liquid 12 is discharged from the second capturer 22*a*, further moves up in the absorption column container 20*c*, and passes through the second washer exit demister 83.

The second washer exit demister 83 mainly traps the mist amine entrained by the decarbonated combustion exhaust gas 3 and mist of the second cleaning liquid 12. The following describes a case of the mist amine. The second washer exit demister 83 is formed to be denser than the capturer exit demister 81. Thus, in gas amine entrained by the decarbonated combustion exhaust gas 3, the mist amine having a large particle size and the mist amine having a small particle size are trapped by the second washer exit demister 83. The mist amine not captured by the first capture space 21*d* and the first washer exit demister 82 is trapped by the second washer exit demister 83.

The decarbonated combustion exhaust gas 3 having passed through the second washer exit demister 83 passes through the third receiver 23*c* of the third washer 23 and reaches the third capturer 23*a*.

The third cleaning liquid 13 accumulated at the third receiver 23*c* is pumped out of the third receiver 23*c* by the third circulation pump 58 and supplied to the third cleaning liquid diffuser 23*b* through the third circulation line 57. During this process, the third cleaning liquid 13 is cooled by the third cleaning liquid cooler 59.

At the third capturer 23*a*, the cooled third cleaning liquid 13 flows down the surface of the third capturer 23*a* while cleaning the decarbonated combustion exhaust gas 3 through gas-liquid contact with the decarbonated combustion exhaust gas 3. With this configuration, mainly, the gas amine entrained by the decarbonated combustion exhaust gas 3 is captured by the third cleaning liquid 13. Having cleaned the decarbonated combustion exhaust gas 3 at the third capturer 23*a*, the third cleaning liquid 13 drops from the third capturer 23*a* and is received by and accumulated at the third receiver 23*c*.

When the third capturer 23*a* is supplied with the cooled third cleaning liquid 13, the temperature of the third capturer 23*a* becomes lower than the temperature of the second washer 22. Accordingly, the decarbonated combustion exhaust gas 3 is cooled by the third cleaning liquid 13, and the temperature of the decarbonated combustion exhaust gas 3 decreases. Water steam entrained by the decarbonated combustion exhaust gas 3 condenses along with the decrease of the temperature of the decarbonated combustion exhaust gas 3, and the condensed water is trapped by the third cleaning liquid 13. Accordingly, the amine concentration of the third cleaning liquid 13 decreases.

The mist amine not captured by the first washer 21 and the second washer 22 is supplied to the third capturer 23*a* of the third washer 23 and cooled at the third capturer 23*a*. At the third capturer 23*a*, the condensed water is also trapped by the mist amine. Accordingly, the particle size of the mist amine increases, and the mist amine becomes more likely to be trapped by the third washer exit demister 84 provided above the third capturer 23*a*.

The decarbonated combustion exhaust gas 3 cleaned by the third cleaning liquid 13 is discharged from the third capturer 23*a*, further moves up in the absorption column container 20*c*, and passes through the third washer exit demister 84.

The third washer exit demister 84 mainly traps the mist amine entrained by the decarbonated combustion exhaust gas 3 and mist of the third cleaning liquid 13. Typically, one of the reasons for providing the third washer exit demister 84 is as a backup for the second washer exit demister 83 to trap the mist amine not captured by the second washer exit demister 83. However, the mist amine is trapped by the capturer exit demister 81, the first washer exit demister 82, and the second washer exit demister 83. Thus, when the mist amine is expected to be sufficiently trapped by the second washer exit demister 83, the third washer exit demister 84 can be set to trap the mist of the third cleaning liquid 13 only. Mist attributable to the third cleaning liquid 13 tends to have a particle size larger than that of the mist amine. Thus, the third washer exit demister 84 is sparsely formed with taken into account a pressure loss of the decarbonated combustion exhaust gas 3.

The decarbonated combustion exhaust gas 3 having passed through the third washer exit demister 84 is discharged from the top part of the absorption column container 20*c*.

According to the present embodiment, the first washer 21 includes a second spray 22*e* configured to spray and drop the first cleaning liquid 11. With this configuration, the first cleaning liquid 11 can be sprayed in the state of mist so that the mist of the first cleaning liquid 11 physically collides with the mist amine entrained by the decarbonated combustion exhaust gas 3 discharged from the carbon dioxide capturer 20a. Accordingly, the first cleaning liquid 11 can efficiently capture the mist amine, which leads to improvement of the efficiency of cleaning the decarbonated combustion exhaust gas 3. As a result, the amount of amine released into air can be reduced.

In addition, according to the present embodiment, the first capture space 21d in which the first cleaning liquid 11 is subjected to gas-liquid contact with the decarbonated combustion exhaust gas 3 while freely falling in the state of mist is formed from the first spray 21e to the first receiver 21c at the first washer 21. With this configuration, mist of the first cleaning liquid 11 sprayed by the first spray 21e can be prevented from colliding with a member such as a structure before reaching the first receiver 21c. Accordingly, the mist of the first cleaning liquid 11 can be prevented from being refined and entrained by the decarbonated combustion exhaust gas 3.

In addition, according to the present embodiment, the flow rate (the first flow rate) of the first cleaning liquid 11 sprayed by the first spray 21e of the first washer 21 per unit area and unit time is larger than the flow rate (the second flow rate) of the second cleaning liquid 12 diffused by the second cleaning liquid diffuser 22b of the second washer 22 per unit area and unit time. With this configuration, the number of mist droplets of the first cleaning liquid 11 sprayed by the first spray 21e can be increased, and the probability of physical collision with the mist amine entrained by the decarbonated combustion exhaust gas 3 can be increased. Accordingly, the mist amine can be further efficiently captured.

In addition, according to the present embodiment, the first pressure of the first cleaning liquid 11 supplied to the first spray 21e of the first washer 21 is higher than the second pressure of the second cleaning liquid 12 supplied to the second cleaning liquid diffuser 22b of the second washer 22. With this configuration, the first vertical direction initial velocity as the velocity component in the vertical direction of the spray speed of mist of the first cleaning liquid 11 from the first spray 21e can be increased. Thus, the mist of the first cleaning liquid 11 can be fast and uniformly supplied into the first capture space 21d, thereby efficiently capturing the mist amine entrained by the decarbonated combustion exhaust gas 3. In addition, the mist of the first cleaning liquid 11 can be prevented from being entrained by the decarbonated combustion exhaust gas 3.

In addition, according to the present embodiment, the third washer exit demister 84 is formed to be sparser than the second washer exit demister 83. With this configuration, the third washer exit demister 84 can trap the mist amine and mist of the third cleaning liquid 13 with a reduced pressure loss occurring to the flow of the decarbonated combustion exhaust gas 3 passing through the third washer exit demister 84. In this case, the power of the blower B for supplying the combustion exhaust gas 2 to the absorption column 20 can be reduced.

In addition, according to the present embodiment, the capturer exit demister 81 is formed to be sparser than the second washer exit demister 83. With this configuration, the capturer exit demister 81 can trap the mist amine with a reduced pressure loss occurring to the flow of the decarbonated combustion exhaust gas 3 passing through the capturer exit demister 81. In this case, the power of the blower B for supplying the combustion exhaust gas 2 to the absorption column 20 can be reduced.

The present embodiment describes above the example in which the capturer exit demister 81 and the third washer exit demister 84 are formed to be sparser than the first washer exit demister 82 and the second washer exit demister 83. However, the present invention is not limited thereto, but the demisters 81 to 84 may be formed at the same space ratio or removal ratio. This is same in each embodiment to be described later.

In addition, the present embodiment describes above the example in which the first spray 21e of the first washer 21 is configured as what is called one-fluid nozzle in which the first cleaning liquid 11 having an increased pressure is sprayed through the spray nozzle holes. However, the present invention is not limited thereto. The first spray 21e only needs to be able to spray the first cleaning liquid 11, and may be configured as a two-fluid nozzle. In this case, the pressure of the first cleaning liquid 11 supplied to the first spray 21e may be lower than 0.1 MPa as long as the first cleaning liquid 11 can be sprayed.

Second Embodiment

Figure 3:
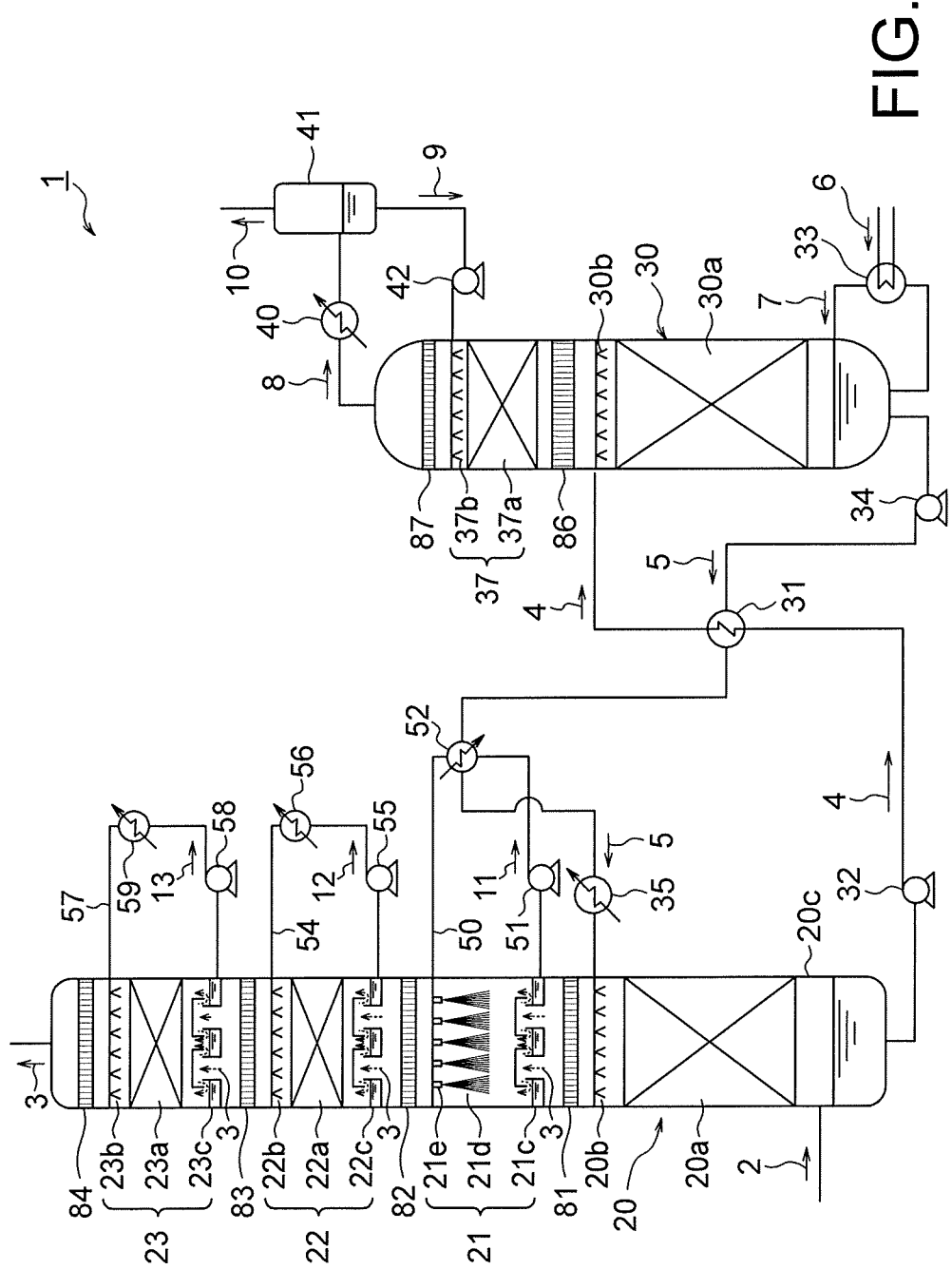
FIG. 3 is a diagram illustrating the entire configuration of a carbon dioxide capture system according to a second embodiment of the present invention.

The following describes a carbon dioxide capture system and a method of operating the carbon dioxide capture system according to a second embodiment of the present invention with reference to FIG. 3.

The second embodiment illustrated in FIG. 3 differs mainly in that a first heater configured to heat the first cleaning liquid is provided, and the other configuration thereof is substantially the same as that of the first embodiment illustrated in FIGS. 1 and 2. In FIG. 3, a part identical to that of the first embodiment illustrated in FIGS. 1 and 2 is denoted by an identical reference sign, and detailed description thereof will be omitted.

In the present embodiment, as illustrated in FIG. 3, the first circulation line 50 is provided with a first heater 52 configured to heat the first cleaning liquid 11. The first heater 52 sets the temperature of the first cleaning liquid 11 to be higher than temperature at an upper end part of the carbon dioxide capturer 20a and higher than the temperature of the second cleaning liquid 12. In the configuration illustrated in FIG. 3, the first heater 52 is provided downstream (the first spray 21e side) of the first circulation pump 51 on the first circulation line 50, but is not limited to this configuration.

At the first heater 52, a heat source for heating the first cleaning liquid 11 is the lean liquid 5 discharged from the regeneration column 30 and having passed through the heat exchanger 31. In other words, in the present embodiment, the lean liquid 5 having passed through the heat exchanger 31 is supplied to the first heater 52 to heat the first cleaning liquid 11.

As described above, the mist amine entrained by the decarbonated combustion exhaust gas 3 is unlikely to be captured by cleaning with cleaning liquid and a packed bed or the like. Thus, in the present embodiment, the mist amine is collided with mist of the first cleaning liquid 11 sprayed by the first spray 21e of the first washer 21, and captured by the mist of the first cleaning liquid 11. However, the efficiency of capturing the mist amine decreases when the particle size of the mist amine decreases (becomes, for example, 0.5 µm or smaller). Thus, to increase the efficiency of capturing the mist amine, it is effective to increase the particle size of the mist amine.

The particle size of the mist amine can be increased by setting the temperature of the second washer 22 to be lower than the temperature of the first washer 21 to increase the temperature difference therebetween. In this case, as the decarbonated combustion exhaust gas 3 passes in the second washer 22, water steam contained in the decarbonated combustion exhaust gas 3 condenses by cooling, and the condensed water is trapped by the mist amine. Accordingly, the particle size of the mist amine is increased.

The temperature of the second washer 22 can be set to be lower than the temperature of the first washer 21 by two methods. The first method heats the first washer 21, and the second method cools the second washer 22.

In some cases, cleaning liquid is cooled to decrease the pressure of amine steam in the cleaning liquid. However, the operating temperature of typical cleaning liquid is 30° C. to 40° C. approximately, whereas the temperature of the cooled cleaning liquid is 20° C. to 30° C. approximately. Accordingly, the temperature difference obtained by the cooling is small. Thus, it is difficult to increase the temperature difference between the first washer 21 and the second washer 22 by cooling the second cleaning liquid 12. When the second cleaning liquid 12 is cooled by using, for example, a chiller having high cooling performance to increase the temperature difference, the temperature of the cleaning liquid can be further decreased but with significantly increased energy taken for the cooling. Reduction of energy taken for capturing carbon dioxide is one of big problems with the carbon dioxide capture system 1. Thus, the increase of energy for cooling the decarbonated combustion exhaust gas 3 is not preferable.

To solve this problem, the present embodiment utilizes waste heat at the outside (peripheral facility) of the carbon dioxide capture system 1. Specifically, the first cleaning liquid 11, which is normally used at room temperature or while being cooled, is heated by the waste heat to increase the temperature of the first cleaning liquid 11, thereby increasing the temperature difference between the first cleaning liquid 11 and the second cleaning liquid 12. Accordingly, the temperature difference between the first washer 21 and the second washer 22 is increased to increase the amount of condensed water at the second washer 22. The temperature of the first washer 21 is preferably higher than the temperature at the upper end part of the carbon dioxide capturer 20*a* by 5° C. to 50° C., more preferably, by 10° C. to 30° C.

The following two problems with a cleaning method using cleaning liquid and a packed bed or the like can be reduced through active generation of condensed water in addition to increase of the particle size of the mist amine through condensation. The following first describes the problems with the cleaning method using cleaning liquid and a packed bed or the like.

[1] Cleaning liquid flowing down the surface of a packed bed is likely to drift. Accordingly, not the entire surface of the packed bed becomes wet (short path generation). Thus, the decarbonated combustion exhaust gas 3 does not contact the cleaning liquid and passes through the packed bed without being cleaned.

[2] Cleaning liquid flowing down the surface of a packed bed absorbs gas amine entrained by the decarbonated combustion exhaust gas 3. The rate of absorbing the gas amine depends on the amine concentration of the cleaning liquid at a gas-liquid contact interface and the amine concentration of the decarbonated combustion exhaust gas 3. Thus, the rate at which the cleaning liquid absorbs amine can be maintained high when the amine concentration of the cleaning liquid at the gas-liquid contact interface is constantly maintained at low concentration. However, the amine concentration of the cleaning liquid at the gas-liquid contact interface is abruptly increased by absorbing amine in the decarbonated combustion exhaust gas 3. In addition, the rate of diffusing amine in the cleaning liquid is low, and thus amine absorbed by the cleaning liquid at the gas-liquid contact interface is unlikely to diffuse into the cleaning liquid. Accordingly, the amine concentration of the cleaning liquid at the gas-liquid contact interface is maintained at high concentration, which causes decrease of the rate of absorbing amine.

In the present embodiment, the above-described two problems are solved by actively utilizing condensed water as described above.

[1] Condensation occurs at the decarbonated combustion exhaust gas 3 flowing through a gap in a packed bed. The decarbonated combustion exhaust gas 3 uniformly flows through the packed bed. Thus, the surface of the packed bed can be uniformly wetted by condensed water, thereby preventing the decarbonated combustion exhaust gas 3 from passing through the packed bed without being cleaned.

[2] The condensed water is trapped by the cleaning liquid by increasing the amount of condensed water. Accordingly, the gas-liquid contact interface of the cleaning liquid is replaced with the condensed water while the condensation occurs. Thus, the amine concentration of the cleaning liquid at the gas-liquid contact interface can be maintained at low concentration, thereby preventing decrease of the rate of absorbing amine.

The above-described two problems can be solved in this manner. The rate of absorbing amine from the decarbonated combustion exhaust gas 3 can be increased to effectively trap the amine, thereby preventing decrease of the amount of captured amine.

In the present embodiment illustrated in FIG. 3, at the first washer 21, mist of the first cleaning liquid 11 heated by the first heater 52 is sprayed by the first spray 21*e* to capture the mist amine entrained by the decarbonated combustion exhaust gas 3. The mist amine not captured by the first washer 21 is heated by the first cleaning liquid 11, supplied to the second capturer 22*a* of the second washer 22, and then cooled. With this configuration, at the second capturer 22*a*, a large amount of water condenses from water steam entrained by the decarbonated combustion exhaust gas 3, and is trapped by the mist amine. Accordingly, the particle size of the mist amine increases, and the mist amine becomes more likely to be trapped by the second washer exit demister 83 provided above the second capturer 22*a*. In addition, the above-described problems [1] and [2] are solved by the second capturer 22*a*, and thus the gas amine entrained by the decarbonated combustion exhaust gas 3 can be effectively captured.

As described above, according to the present embodiment, the decarbonated combustion exhaust gas 3 can be heated by the first washer 21 to increase the temperature difference between the first washer 21 and the second washer 22. With this configuration, the particle size of the mist amine entrained by the decarbonated combustion exhaust gas 3 can increased at the second washer 22 so that the mist amine is efficiently trapped by the second washer exit demister 83. In particular, in the present embodiment, since the heated first cleaning liquid 11 is sprayed, the decarbonated combustion exhaust gas 3 passing through the first capture space 21*d* can be uniformly heated. Thus, the temperature of the decarbonated combustion exhaust gas 3 discharged from the first capture space 21*d* can be uniformly increased to promote water condensation at the second washer 22. As a result, the efficiency of cleaning the decarbonated combustion exhaust gas 3 can be improved.

In addition, according to the present embodiment, the heat source of the first heater 52 is the lean liquid 5 discharged from the regeneration column 30 and having passed through the heat exchanger 31. With this configuration, the temperature of the first cleaning liquid 11 can be set to be higher than the temperature at the upper end part of the carbon dioxide capturer 20a and the temperature of the second cleaning liquid 12. Thus, the temperature difference between the first washer 21 and the second washer 22 can be increased. In addition, since the lean liquid 5 having passed through the heat exchanger 31 is used as the heat source for increasing the temperature difference, waste heat can be effectively used.

The present embodiment described above the example in which the heat source of the first heater 52 is the lean liquid 5 discharged from the regeneration column 30 and having passed through the heat exchanger 31. However, the present invention is not limited thereto, but the heat source of the first heater 52 may be any heat source capable of setting the temperature of the first cleaning liquid 11 to be higher than the temperature of the second cleaning liquid 12. For example, the heat source may be the heating medium 6 discharged from the reboiler 33 or the combustion exhaust gas 2 supplied to the absorption column 20. Any heat source can heat the first cleaning liquid 11 through effective use of waste heat. Among the heat sources, the combustion exhaust gas 2 is normally discharged from a boiler at a thermal plant, passes through a denitrification apparatus, a dedusting apparatus, a desulfurization apparatus, and the like, and then is supplied to the absorption column 20 of the carbon dioxide capture system 1 and subjected to decarbonation processing. The combustion exhaust gas 2 before being supplied to the absorption column 20 has heat at a temperature of 50° C. to 90° C. approximately, and thus this waste heat can be effectively used. Alternatively, the heat source of the first heater 52 may be an electric heater.

Third Embodiment

Figure 4:
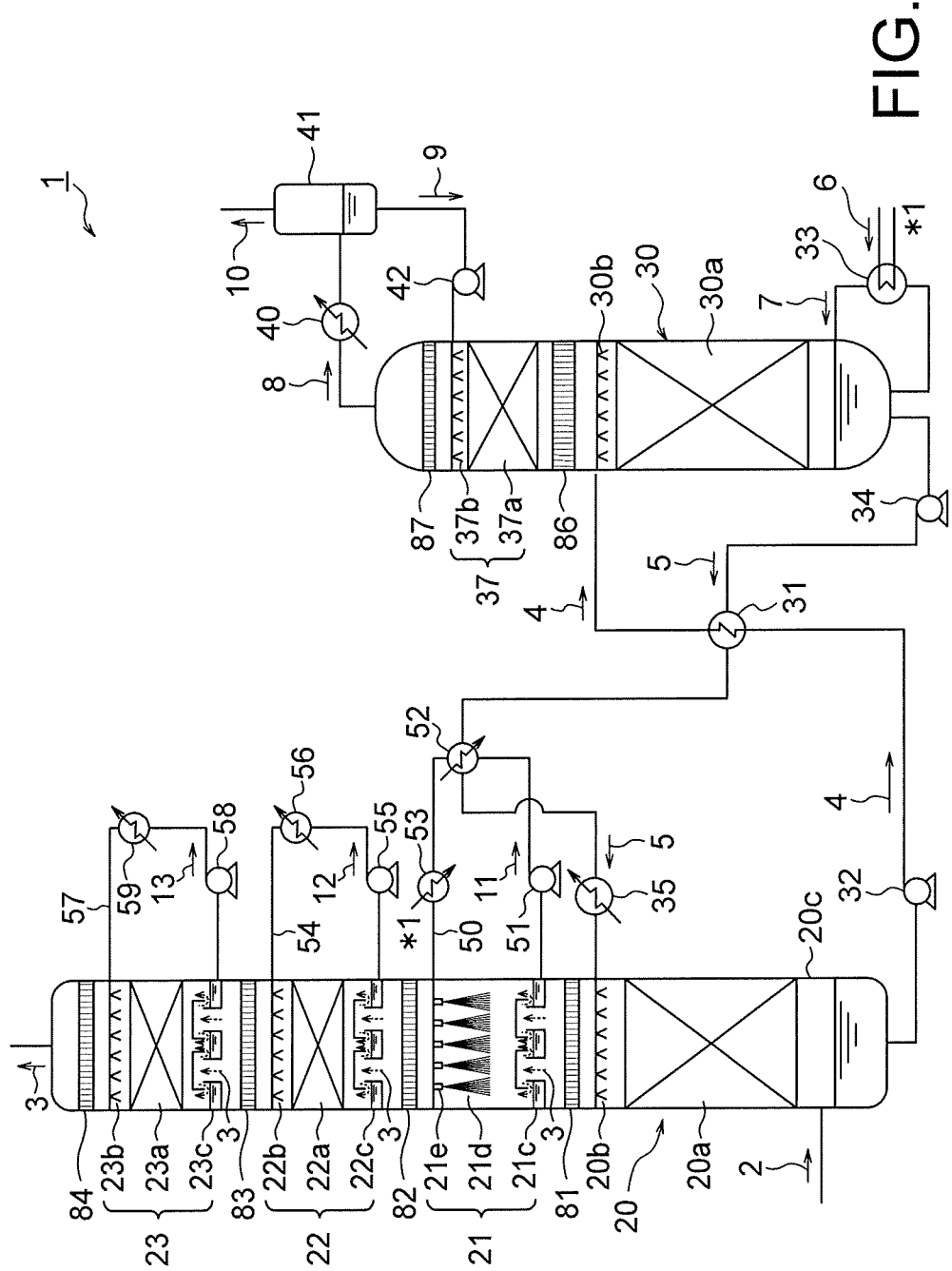
FIG. 4 is a diagram illustrating the entire configuration of a carbon dioxide capture system according to a third embodiment of the present invention.

The following describes a carbon dioxide capture system and a method of operating the carbon dioxide capture system according to a third embodiment of the present invention with reference to FIG. 4.

The third embodiment illustrated in FIG. 4 mainly differs in that a second heater configured to further heat the first cleaning liquid heated by the first heater is provided, and the other configuration thereof is substantially same as that of the second embodiment illustrated in FIG. 3. In FIG. 4, a part identical to that of the second embodiment illustrated in FIG. 3 is denoted by an identical reference sign, and detailed description thereof will be omitted.

In the present embodiment, as illustrated in FIG. 4, the first circulation line 50 is provided with the second heater 53 configured to further heat the first cleaning liquid 11 heated by the first heater 52. In the configuration illustrated in FIG. 4, the second heater 53 is provided downstream (the first spray 21e side) of the first heater 52 on the first circulation line 50.

A heat source for heating the first cleaning liquid 11 at the second heater 53 is the heating medium 6 discharged from the reboiler 33, differently from the heat source of the first heater 52. Specifically, in the present embodiment, the heating medium 6 discharged from the reboiler 33 further heats the first cleaning liquid 11 supplied to the second heater 53 and heated by the first heater 52. The temperature of the heating medium 6 having passed through the reboiler 33 is higher than the temperature of the lean liquid 5 discharged from the heat exchanger 31, and thus the first cleaning liquid 11 heated by the first heater 52 can be further heated by the heating medium 6. Accordingly, the temperature of the first cleaning liquid 11 can be further increased.

As described above, according to the present embodiment, the second heater 53 further heats the first cleaning liquid 11 heated by the first heater 52. With this configuration, the temperature of the first cleaning liquid 11 can be further increased to further increase the temperature difference between the first washer 21 and the second washer 22. Thus, the particle size of the mist amine entrained by the decarbonated combustion exhaust gas 3 can be further increased at the second washer 22 so that the mist amine is further efficiently trapped by the second washer exit demister 83. As a result, the efficiency of cleaning the decarbonated combustion exhaust gas 3 can be further improved.

In addition, according to the present embodiment, the heat source of the second heater 53 is the heating medium 6 discharged from the reboiler 33. With this configuration, waste heat can be effectively used to increase the temperature difference between the first washer 21 and the second washer 22.

The present embodiment described above the example in which the heat source of the second heater 53 is the heating medium 6 discharged from the reboiler 33. However, the present invention is not limited thereto, but the heat source of the second heater 53 may be any heat source capable of further heating the first cleaning liquid 11. For example, the heat source may be the combustion exhaust gas 2 supplied to the absorption column 20. Alternatively, the heat source of the second heater 53 may be an electric heater.

Fourth Embodiment

Figure 5:
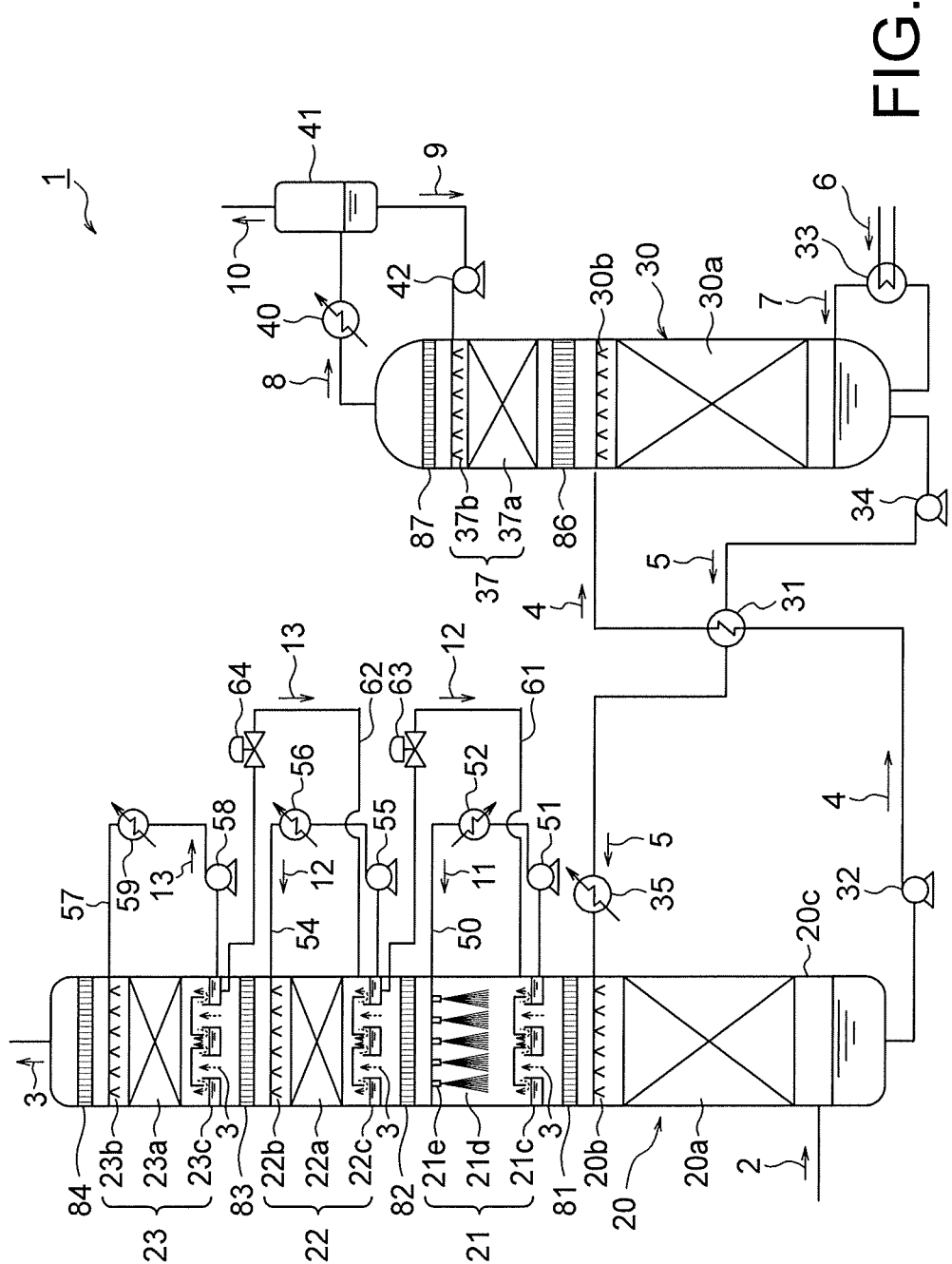
FIG. 5 is a diagram illustrating the entire configuration of a carbon dioxide capture system according to a fourth embodiment of the present invention.

The following describes a carbon dioxide capture system and a method of operating the carbon dioxide capture system according to a fourth embodiment of the present invention with reference to FIG. 5.

The fourth embodiment illustrated in FIG. 5 mainly differs in that a first bypass line through which part of the second cleaning liquid is mixed into the first cleaning liquid and a second bypass line through which part of the third cleaning liquid is mixed into the second cleaning liquid are provided, and the other configuration thereof is substantially same as that of the second embodiment illustrated in FIG. 3. In FIG. 5, a part identical to that of the second embodiment illustrated in FIG. 3 is denoted by an identical reference sign, and detailed description thereof will be omitted.

In the present embodiment, as illustrated in FIG. 5, a first bypass line 61 through which part of the second cleaning liquid 12 is mixed into the first cleaning liquid 11 is provided. FIG. 5 illustrates an example in which an upstream end part (end part on the second washer 22 side) of the first bypass line 61 is connected to the second receiver 22c of the second washer 22. With this configuration, part of the second cleaning liquid 12 accumulated at the second receiver 22c flows into the first bypass line 61. In the illustrated example, a downstream end part (end part on the first washer 21 side) of the first bypass line 61 is disposed near a position above the first receiver 21c of the first washer 21. With this configuration, the second cleaning liquid 12 having passed through the first bypass line 61 is supplied to the first receiver 21c.

The first bypass line 61 may be provided with a first bypass valve 63. For example, the first bypass valve 63 may be controlled based on the water surface level of the second cleaning liquid 12 accumulated at the second receiver 22c. In this case, the second receiver 22c may be provided with a water surface level meter (not illustrated) to increase the opening degree of the first bypass valve 63 when the water surface level of the second cleaning liquid 12 accumulated at the second receiver 22c is higher than a predetermined reference level or to decrease the opening degree of the first bypass valve 63 when the water surface level is lower than the predetermined reference level. Alternatively, the opening degree of the first bypass valve 63 may be adjusted in accordance with the water surface level of the second cleaning liquid 12.

In the present embodiment, as illustrated in FIG. 5, a second bypass line 62 through which part of the third cleaning liquid 13 is mixed into the second cleaning liquid 12 is provided. FIG. 5 illustrates an example in which an upstream end part (end part on the third washer 23 side) of the second bypass line 62 is connected to the third receiver 23c of the third washer 23. With this configuration, part of the third cleaning liquid 13 accumulated at the third receiver 23c flows into the second bypass line 62. In the illustrated example, a downstream end part (end part on the second washer 22 side) of the second bypass line 62 is disposed near a position above the second receiver 22c of the second washer 22. With this configuration, the third cleaning liquid 13 having passed through the second bypass line 62 is supplied to the second receiver 22c.

The second bypass line 62 may be provided with a second bypass valve 64. For example, the second bypass valve 64 may be controlled based on the water surface level of the third cleaning liquid 13 accumulated at the third receiver 23c. In this case, the third receiver 23c is provided with a water surface level meter (not illustrated) to increase the opening degree of the second bypass valve 64 when the water surface level of the third cleaning liquid 13 accumulated at the third receiver 23c is higher than a predetermined reference level or to decrease the opening degree of the second bypass valve 64 when the water surface level is lower than the predetermined reference level. Alternatively, the opening degree of the second bypass valve 64 may be adjusted in accordance with the water surface level of the third cleaning liquid 13.

As described above, according to the present embodiment, part of the second cleaning liquid 12 having an amine concentration lower than that of the first cleaning liquid 11 can be mixed into the first cleaning liquid 11 through the first bypass line 61. With this configuration, the amine concentration of the first cleaning liquid 11 can be decreased, thereby preventing decrease of the amine capture performance of the first washer 21. In addition, the second cleaning liquid 12 can be reused as the first cleaning liquid 11 and thus needs not be discarded, which leads to decrease of the frequency of supplying new cleaning liquid to the first cleaning liquid 11.

In addition, according to the present embodiment, part of the third cleaning liquid 13 having an amine concentration lower than that of the second cleaning liquid 12 can be mixed into the second cleaning liquid 12 through the second bypass line 62. With this configuration, the amine concentration of the second cleaning liquid 12 can be decreased, thereby preventing decrease of the amine capture performance of the second washer 22. In addition, the third cleaning liquid 13 can be reused as the second cleaning liquid 12 and thus needs not be discarded, which leads to decrease of the frequency of supplying new cleaning liquid to the second cleaning liquid 12.

The present embodiment describes above the example in which the first heater 52 is provided on the first circulation line 50 as illustrated in FIG. 5. However, the present invention is not limited thereto, but no first heater 52 may be provided.

In addition, the present embodiment describes above the example in which the second bypass line 62 through which part of the third cleaning liquid 13 is mixed into the second cleaning liquid 12 is provided as illustrated in FIG. 5. However, the present invention is not limited thereto, but no second bypass line 62 may be provided.

Fifth Embodiment

Figure 6:
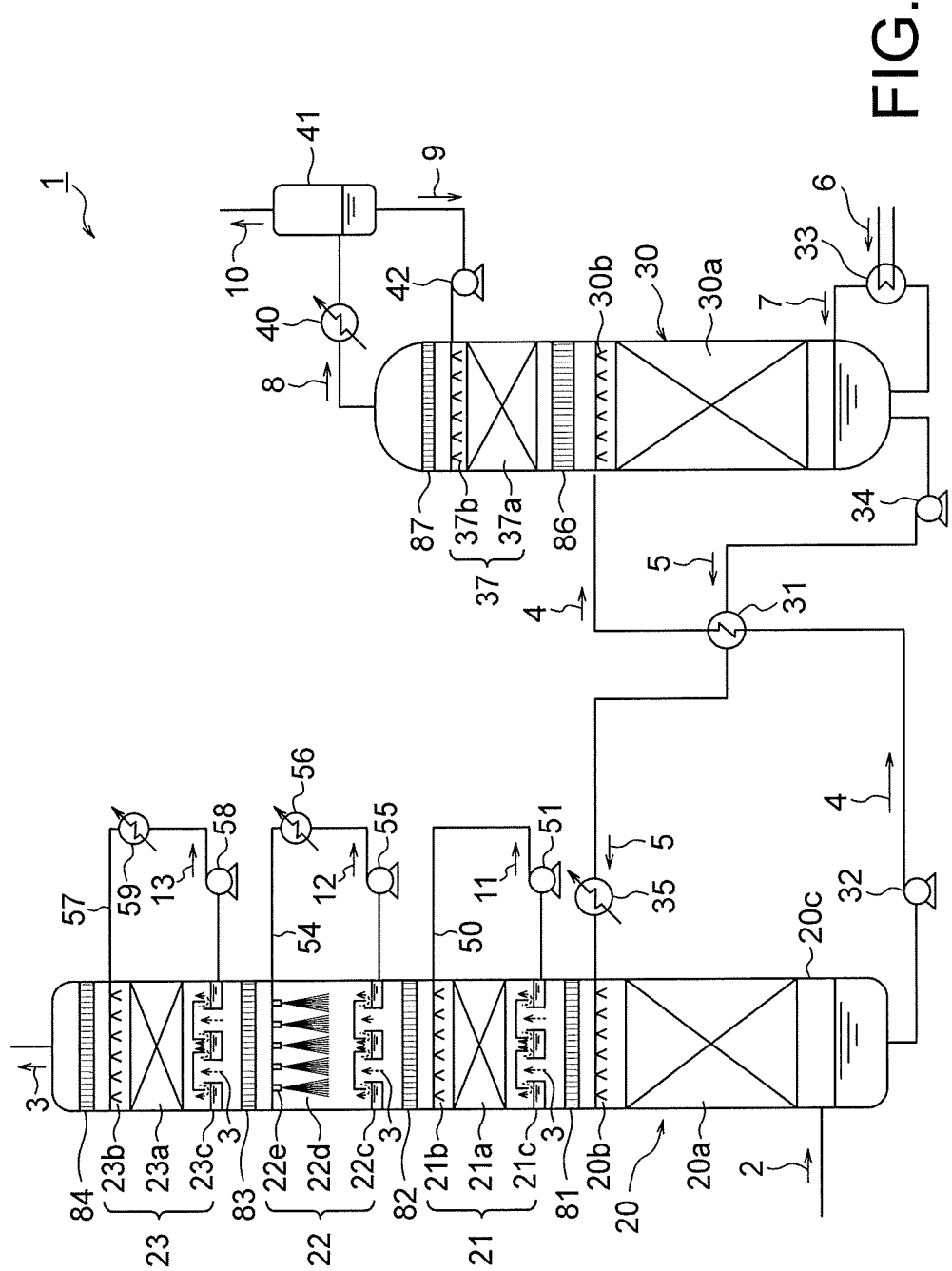
FIG. 6 is a diagram illustrating the entire configuration of a carbon dioxide capture system according to a fifth embodiment of the present invention.

The following describes a carbon dioxide capture system and a method of operating the carbon dioxide capture system according to a fifth embodiment of the present invention with reference to FIG. 6.

The fifth embodiment illustrated in FIG. 6 mainly differs in that the first cleaning liquid cleans the decarbonated combustion exhaust gas while flowing down the surface of the first capturer, and the second cleaning liquid cleans the decarbonated combustion exhaust gas while dropping in the state of mist in the capture space, and the other configuration thereof is substantially the same as that of the first embodiment illustrated in FIGS. 1 and 2. In FIG. 6, a part identical to that of the first embodiment illustrated in FIGS. 1 and 2 is denoted by an identical reference sign, and detailed description thereof will be omitted.

In the present embodiment, as illustrated in FIG. 6, schematically, the first washer 21 illustrated in FIG. 1 is provided above the second washer 22 illustrated in FIG. 1.

More specifically, the first washer 21 includes the first capturer 21a (packed bed or the like), and a first cleaning liquid diffuser 21b provided above the first capturer 21a. In other words, the first capturer 21a is provided in place of the first capture space 21d, and the first cleaning liquid diffuser 21b is provided in place of the first spray 21e. Similarly to the second capturer 22a and the third capturer 23a, the first capturer 21a is configured as a countercurrent gas-liquid contact device. Specifically, the first capturer 21a is made of, for example, a packed bed or the like. In the first capturer 21a, the first cleaning liquid 11 flows down the surface of an internal structure provided to increase gas-liquid contact interfaces of fillers, particles, and the like filling the structure, while capturing amine entrained by the decarbonated combustion exhaust gas 3 (mainly, gas amine) through gas-liquid contact with the decarbonated combustion exhaust gas 3 to remove the amine from the decarbonated combustion exhaust gas 3. Similarly to the second cleaning liquid diffuser 22b and the third cleaning liquid diffuser 23b, the first cleaning liquid diffuser 21b diffuses and drops the first cleaning liquid 11 toward the first capturer 21a. In this manner, the first cleaning liquid diffuser 21b supplies the first cleaning liquid 11 so that the first cleaning liquid 11 flows down the surface of a structure inside the first capturer 21a. The first cleaning liquid diffuser 21b non-forcibly freely falls the first cleaning liquid 11 to the first capturer 21a through the effect of gravitational force. The first cleaning liquid 11 flowing down the surface of an internal structure in the first capturer 21a is received by and accumulated at the first receiver 21c.

The second washer 22 includes a second capture space 22d, and the second spray 22e provided above the second capture space 22d.

Similarly to the first capture space 21d, the second capture space 22d is a space in which the second cleaning liquid 12 sprayed by the second spray 22e is subjected to gas-liquid contact with the decarbonated combustion exhaust gas 3 having passed through the second receiver 22c and moving up, while freely falling (in other words, falls without contacting the surface of a structure or the like in the space) in the state of mist, and in which amine entrained by the decarbonated combustion exhaust gas 3 (mainly, mist amine) is captured. The second capture space 22d extends from the second spray 22e to the second receiver 22c. The second capture space 22d has a configuration same as that of the first capture space 21d of the first washer 21 described above, and thus detailed description thereof will be omitted. The second spray 22e has a configuration same as that of the first spray 21e of the first washer 21 described above, and thus detailed description thereof will be omitted.

The decarbonated combustion exhaust gas 3 having passed through the capturer exit demister 81 passes through the first receiver 21c of the first washer 21 and reaches the first capturer 21a of the first washer 21.

The first cleaning liquid 11 accumulated at the first receiver 21c is pumped out of the first receiver 21c by the first circulation pump 51 and supplied to the first cleaning liquid diffuser 21b through the first circulation line 50. In the present embodiment, since the first circulation line 50 is provided with, for example, no heaters 52 and 53 to be described later nor cooler, the first cleaning liquid 11 passing through the first circulation line 50 is not actively heated nor cooled.

At the first capturer 21a, the first cleaning liquid 11 flows down the surface of the first capturer 21a while cleaning the decarbonated combustion exhaust gas 3 through gas-liquid contact with the decarbonated combustion exhaust gas 3. With this configuration, mainly, the gas amine entrained by the decarbonated combustion exhaust gas 3 is captured by the first cleaning liquid 11. Having cleaned the decarbonated combustion exhaust gas 3 at the first capturer 21a, the first cleaning liquid 11 drops from the first capturer 21a and is received by and accumulated at the first receiver 21c.

The decarbonated combustion exhaust gas 3 cleaned by the first cleaning liquid 11 is discharged from the first capturer 21a, further moves up in the absorption column container 20c, and passes through the first washer exit demister 82.

The first washer exit demister 82 mainly traps the mist amine entrained by the decarbonated combustion exhaust gas 3 and mist of the first cleaning liquid 11. The decarbonated combustion exhaust gas 3 having passed through the first washer exit demister 82 passes through the second receiver 22c of the second washer 22 and reaches the second capturer 22a.

The second cleaning liquid 12 accumulated at the second receiver 22c is pumped out of the second receiver 22c by the second circulation pump 55 and supplied to the second cleaning liquid diffuser 22b through the second circulation line 54. During this process, the second cleaning liquid 12 is cooled by the second cleaning liquid cooler 56 so that the temperature of the second cleaning liquid 12 becomes lower than the temperature of the first cleaning liquid 11.

The second cleaning liquid 12 is sprayed from the spray nozzle holes of the second spray 22e, drops in the second capture space 22d, and directly reaches the second receiver 22c. During this process, while dropping in the state of mist, the second cleaning liquid 12 is subjected to gas-liquid contact with the decarbonated combustion exhaust gas 3 so that the decarbonated combustion exhaust gas 3 is cleaned by the second cleaning liquid 12. Accordingly, the mist amine entrained by the decarbonated combustion exhaust gas 3 is captured by the second cleaning liquid 12. The second cleaning liquid 12 having reached the second receiver 22c is received by and accumulated at the second receiver 22c.

Since the cooled second cleaning liquid 12 is sprayed from the second spray 22e in the second capture space 22d, the temperature of the second capture space 22d is lower than the temperature of the first capturer 21a. Accordingly, the decarbonated combustion exhaust gas 3 is cooled by the second cleaning liquid 12 so that the temperature of the decarbonated combustion exhaust gas 3 decreases. Water steam entrained by the decarbonated combustion exhaust gas 3 condenses along with the decrease of the temperature of the decarbonated combustion exhaust gas 3, and the condensed water is trapped by the second cleaning liquid 12. Accordingly, the particle size of the mist amine is increased so that the mist amine is trapped by the second washer exit demister 83 provided above the second capture space 22d. Since the cooled second cleaning liquid 12 is sprayed in the second capture space 22d, the decarbonated combustion exhaust gas 3 passing through the second capture space 22d can be uniformly cooled. This promotes the condensation onto the mist amine, thereby uniformly increasing the particle size of the mist amine. In addition, the mist amine having an increased particle size can be dropped by the second cleaning liquid 12 sprayed from the second spray 22e in the second capture space 22d, which leads to improvement of the capture efficiency.

As described above, according to the present embodiment, the second washer 22 includes the second capture space 22d and the second spray 22e. With this configuration, the second cleaning liquid 12 can be sprayed in the state of mist so that the mist of the second cleaning liquid 12 can physically collide with the mist amine entrained by the decarbonated combustion exhaust gas 3 discharged from the first washer 21. Thus, the mist amine can be efficiently captured by the second cleaning liquid 12, and the efficiency of cleaning the decarbonated combustion exhaust gas 3 can be improved. In particular, since the second cleaning liquid 12 is cooled by the second cleaning liquid cooler 56, the decarbonated combustion exhaust gas 3 can be uniformly cooled. Accordingly, condensation of the mist amine entrained by the decarbonated combustion exhaust gas 3 can be uniformly promoted, and the particle size of the mist amine can be uniformly increased. In this case, the mist amine can be efficiently trapped by the second washer exit demister 83, and the amount of amine released into air can be reduced.

Sixth Embodiment

Figure 7:
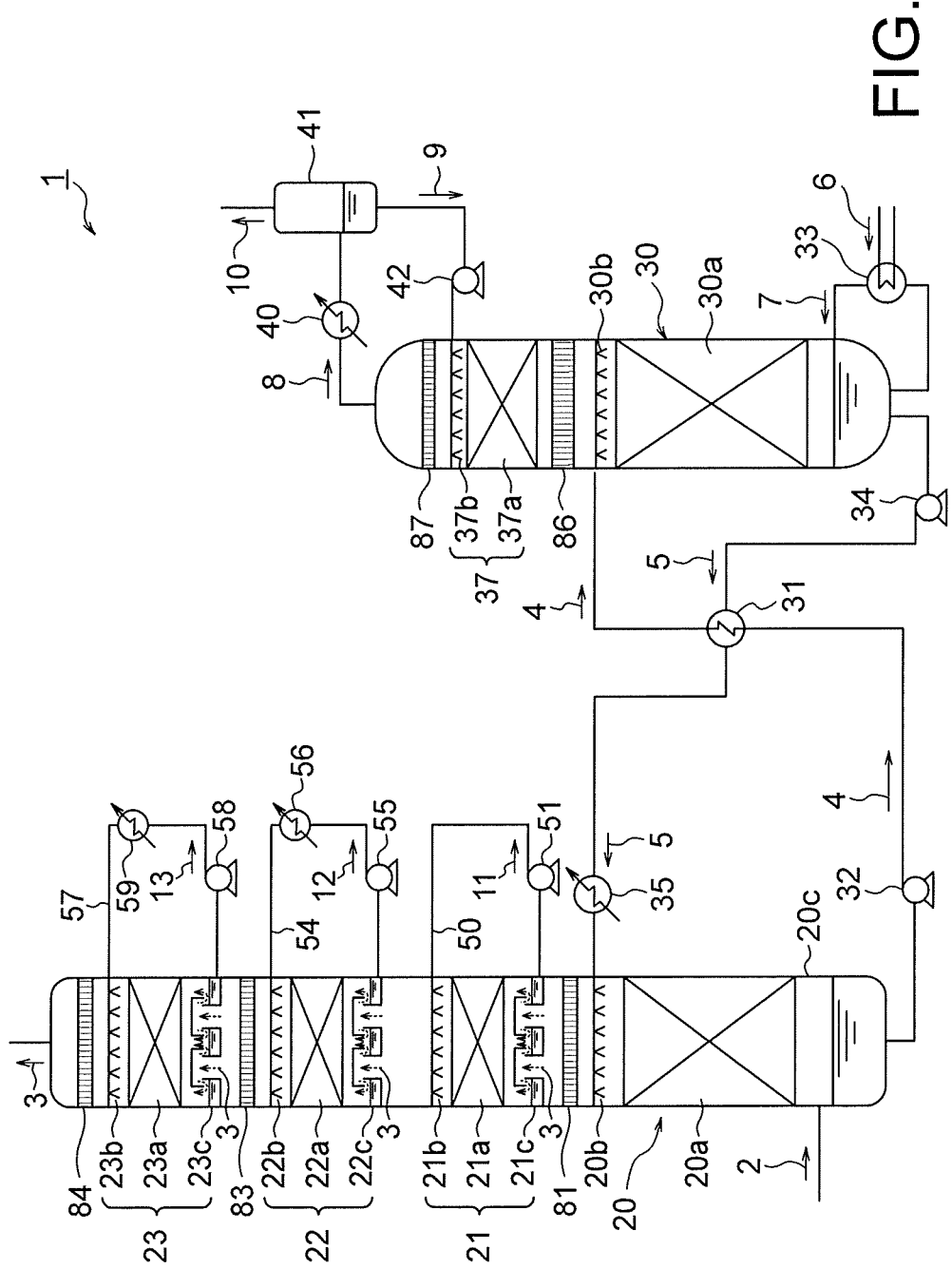
FIG. 7 is a diagram illustrating the entire configuration of a carbon dioxide capture system according to a sixth embodiment of the present invention.
Figure 8:
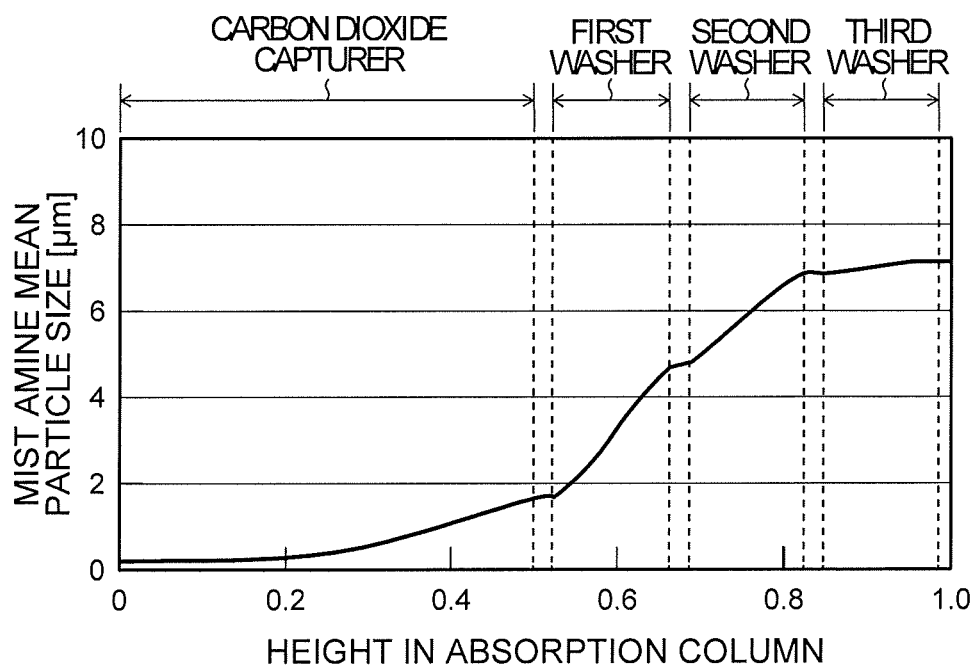
FIG. 8 is a graph illustrating transition of the particle size of mist amine in an absorption column in the carbon dioxide capture system illustrated in FIG. 7.
Figure 9:
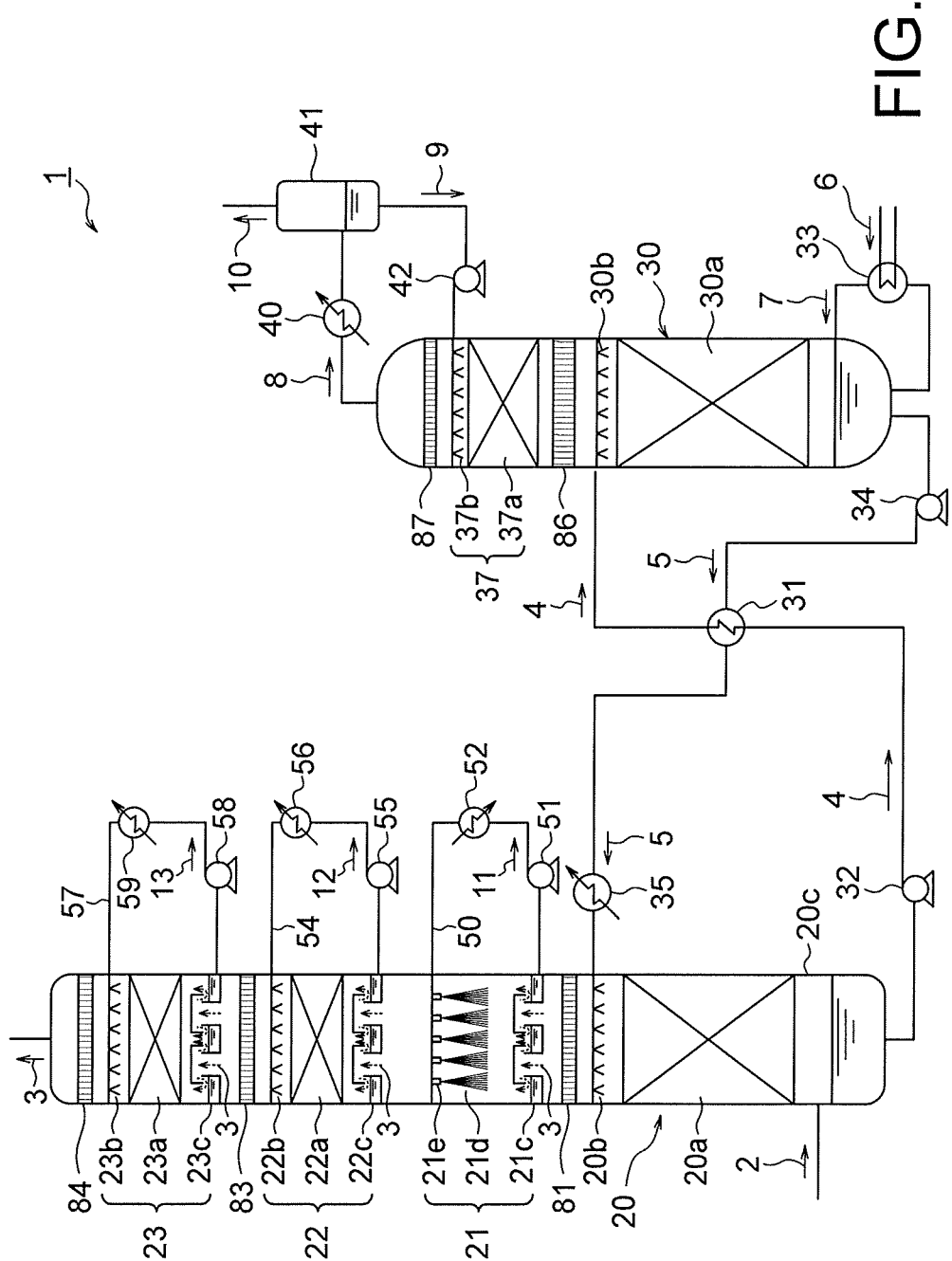
FIG. 9 is a diagram illustrating a modification of the carbon dioxide capture system illustrated in FIG. 7.

The following describes a carbon dioxide capture system and a method of operating the carbon dioxide capture system according to a sixth embodiment of the present invention with reference to FIGS. 7 to 9.

The sixth embodiment illustrated in FIGS. 7 to 9 mainly differs in that no first washer exit demister is provided, and the other configuration thereof is substantially the same as that of the first embodiment illustrated in FIGS. 1 and 2. In FIGS. 7 to 9, a part identical to that of the first embodiment illustrated in FIGS. 1 and 2 is denoted by an identical reference sign, and detailed description thereof will be omitted.

In the present embodiment, as illustrated in FIG. 7, the first washer 21 includes the first capturer 21a (packed bed or the like), the surface of which the first cleaning liquid 11 flows down while capturing amine through gas-liquid contact with the decarbonated combustion exhaust gas 3, and the first cleaning liquid diffuser 21*b* configured to diffuse and drop the first cleaning liquid 11 toward the first capturer 21*a*. In other words, the first capturer 21*a* is provided in place of the first capture space 21*d*, and the first cleaning liquid diffuser 21*b* is provided in place of the first spray 21*e*. The first washer 21 has a configuration same as that of the fifth embodiment illustrated in FIG. 6, and thus detailed description thereof will be omitted.

As illustrated in FIG. 7, the first washer exit demister 82 as illustrated in, for example, FIG. 1 is not provided between the first washer 21 and the second washer 22. With this configuration, the decarbonated combustion exhaust gas 3 discharged from the first washer 21 is directly supplied to the second washer 22.

Thus, in the present embodiment, the efficiency of capturing mist amine is improved by adjusting arrangement of the demisters. Specifically, in the present embodiment, the capturer exit demister 81, the second washer exit demister 83, and the third washer exit demister 84 are provided, but the first washer exit demister 82 is not provided.

The following describes a characteristic of change in the particle size of the mist amine entrained by the decarbonated combustion exhaust gas 3 in the absorption column container 20*c* with reference to FIG. 8. FIG. 8 is a graph illustrating transition of the particle size of the mist amine entrained by the decarbonated combustion exhaust gas 3 in the absorption column container 20*c*. The horizontal axis represents the height position in the absorption column container 20*c* in a dimensionless number. FIG. 8 illustrates change of the particle size under a condition that no demisters are disposed and the washers 21 to 23 include capturers in which the cleaning liquids 11 to 13 flow down along the surface of an internal structure.

The particle size of the mist amine entrained by the decarbonated combustion exhaust gas 3 gradually increases in the carbon dioxide capturer 20*a*.

The decarbonated combustion exhaust gas 3 discharged from the carbon dioxide capturer 20*a* and having reached the first washer 21 is cleaned by the first cleaning liquid 11 having a water concentration higher than that of the lean liquid 5. Thus, according to the gas-liquid equilibrium relation, the first washer 21 has a water steam partial pressure higher than that of the carbon dioxide capturer 20*a*. Accordingly, condensation to the mist amine occurs, and the particle size of the mist amine increases. In particular, the rate of condensation to the mist amine is higher in the first washer 21 than in the second washer 22 and the third washer 23 to be described later, which promotes increase of the particle size of the mist amine.

The decarbonated combustion exhaust gas 3 discharged from the first washer 21 and having reached the second washer 22 is cleaned by the second cleaning liquid 12 having a water concentration higher than that of the first cleaning liquid 11. Thus, according to the gas-liquid equilibrium relation, the second washer 22 has a water steam partial pressure higher than that of the first washer 21. Accordingly, condensation to the mist amine occurs, and the particle size of the mist amine increases. However, the increase rate of the particle size of the mist amine is smaller in the second washer 22 than in the first washer 21. This is because the water steam partial pressure is higher in the second washer 22 than in the first washer 21, but the difference in the water steam partial pressure between the first washer 21 and the second washer 22 is not significantly large but is smaller than the difference in the water steam partial pressure between the carbon dioxide capturer 20*a* and the first washer 21. As another reason, the degree of increase of the particle size when condensation to the mist amine occurs decreases as the particle size of the mist amine increases at a constant condensation amount. Accordingly, the particle size of the mist amine more gradually increases in the second washer 22 than in the first washer 21.

The decarbonated combustion exhaust gas 3 discharged from the second washer 22 and having reached the third washer 23 is cleaned by the third cleaning liquid 13 having a water concentration higher than that of the second cleaning liquid 12. Thus, according to the gas-liquid equilibrium relation, the water steam partial pressure is higher in the third washer 23 than in the second washer 22. Accordingly, condensation to the mist amine occurs, and the particle size of the mist amine increases. However, for the reasons in the description of the second washer 22, the increase rate of the particle size of the mist amine is smaller in the third washer 23 than in the second washer 22. Thus, the particle size of the mist amine more gradually increases in the third washer 23 than in the second washer 22.

The first washer exit demister 82 is not provided in the present embodiment based on such transition of the particle size of the mist amine. Specifically, according to FIG. 8, the particle size of the mist amine in the first washer 21 is generally 5 μm or smaller, which is a particle size with which the mist amine is unlikely to be trapped by a demister. When the first washer exit demister 82 is not provided, the mist amine having a small particle size is supplied to the second washer 22, and then the particle size thereof can be increased in the second washer 22 as illustrated in FIG. 8. According to FIG. 8, the particle size of the mist amine generally increases to 5 μm or larger in the second washer 22, which is a particle size with which the mist amine is likely to be trapped by a demister. Accordingly, the mist amine can be efficiently captured by the second washer exit demister 83. In this manner, the first washer exit demister 82 is not provided in the present embodiment for efficient capture of the mist amine. In this case, a pressure loss occurring to the flow of the decarbonated combustion exhaust gas 3 in the absorption column container 20*c* can be reduced, and the power of the blower B (refer to FIG. 1) described above can be reduced.

As described above, according to the present embodiment, no first washer exit demister 82 is provided between the first washer 21 and the second washer 22, and the decarbonated combustion exhaust gas 3 discharged from the first washer 21 is directly supplied to the second washer 22 without passing through a demister. With this configuration, the mist amine having a small particle size can be supplied to the second washer 22 and grown to increase the particle size in the second washer 22 until the mist amine is more likely to be trapped by a demister. Accordingly, the mist amine having the increased particle size can be efficiently captured by the second washer exit demister 83. As a result, the efficiency of cleaning the decarbonated combustion exhaust gas 3 can be improved, and the amount of amine released into air can be reduced.

In the present embodiment, too, the third washer exit demister 84 is formed to be sparser than the second washer exit demister 83. With this configuration, the third washer exit demister 84 can trap the mist amine and mist of the third cleaning liquid 13 with a reduced pressure loss occurring to the flow of the decarbonated combustion exhaust gas 3 passing through the third washer exit demister 84. In this case, the power of the blower B for supplying the combustion exhaust gas 2 to the absorption column 20 can be reduced.

In addition, in the present embodiment, too, the capturer exit demister 81 is formed to be sparser than the second washer exit demister 83. With this configuration, the capturer exit demister 81 can trap the mist amine with a reduced pressure loss occurring to the flow of the decarbonated combustion exhaust gas 3 passing through the capturer exit demister 81. In this case, the power of the blower B for supplying the combustion exhaust gas 2 to the absorption column 20 can be reduced.

The present embodiment describes above the example in which the first washer 21 includes the first capturer 21a, the surface of which the first cleaning liquid 11 flows down while capturing amine through gas-liquid contact with the decarbonated combustion exhaust gas 3, and the first cleaning liquid diffuser 21b configured to diffuse and drop the first cleaning liquid 11 toward the first capturer 21a. However, the present invention is not limited thereto. As illustrated in FIG. 9, similarly to the first embodiment illustrated in FIGS. 1 and 2, the first washer 21 may include the first capture space 21d in which the first cleaning liquid 11 is subjected to gas-liquid contact with the decarbonated combustion exhaust gas 3 while dropping in the state of mist, and the first spray 21e configured to spray the first cleaning liquid 11 toward the first capture space 21d. In such a case, too, the effects of the sixth embodiment described above can be obtained.

According to the above-described embodiments, the amount of amine released into air can be reduced by using cleaning liquid to clean combustion exhaust gas.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, it will be understood that these embodiments can be at least partially combined properly without departing from the spirit of the present invention.

For example, the second to fifth embodiments describe the example in which the first washer 21 includes the first capture space 21d in which the first cleaning liquid 11 is subjected to gas-liquid contact with the decarbonated combustion exhaust gas 3 while dropping in the state of mist, and the first spray 21e configured to spray the first cleaning liquid 11 toward the first capture space 21d. However, similarly to the configuration illustrated in FIG. 7, the first washer 21 may include the first capturer 21a, the surface of which the first cleaning liquid 11 flows down while capturing amine through gas-liquid contact with the decarbonated combustion exhaust gas 3, and the first cleaning liquid diffuser 21b provided above the first capturer 21a. In such a case, too, the effects of the embodiments can be obtained.

The second to fifth embodiments describe the example in which the first washer exit demister 82 is provided between the first washer 21 and the second washer 22. However, similarly to the configurations illustrated in FIGS. 7 and 9, no first washer exit demister 82 may be provided. In such a case, too, the effects of the embodiments can be obtained.

The invention claimed is:

1. A carbon dioxide capture system comprising:
   a carbon dioxide capturer configured to cause carbon dioxide contained in combustion exhaust gas to be absorbed by absorbing liquid containing amine to produce a decarbonated combustion exhaust gas;
   a first washer configured to clean the decarbonated combustion exhaust gas discharged from the carbon dioxide capturer by using a first cleaning liquid to capture the amine entrained by the combustion exhaust gas;
   a second washer configured to clean the decarbonated combustion exhaust gas discharged from the first washer by using a second cleaning liquid to capture the amine entrained by the combustion exhaust gas:
   a spray provided to the first washer and configured to spray the first cleaning liquid supplied under first pressure;
   a cleaning liquid diffuser provided to the second washer and configured to diffuse and drop the second cleaning liquid supplied under second pressure lower than the first pressure;
   a receiver provided below the spray of the first washer and configured to receive the first cleaning liquid sprayed by the spray; and
   a capture space that is provided between the spray and the receiver and in which the first cleaning liquid sprayed by the spray is subjected to gas-liquid contact with the combustion exhaust gas while freely falling, wherein the first cleaning liquid having passed through the capture space is directly received by the receiver, the capture space extends from the spray to the receiver, and the capture space includes no structure having a surface that the first cleaning liquid flows down.

2. The carbon dioxide capture system according to claim 1, wherein the flow rate of the first cleaning liquid sprayed by the spray per unit area and unit time is larger than the flow rate of the second cleaning liquid diffused by the cleaning liquid diffuser per unit area and unit time.

3. The carbon dioxide capture system according to claim 1, further comprising a first heater configured to heat the first cleaning liquid.

4. The carbon dioxide capture system according to claim 1, further comprising a first bypass line through which part of the second cleaning liquid is mixed into the first cleaning liquid, wherein the second washer is provided above the first washer.

5. The carbon dioxide capture system according to claim 4, further comprising:
   a third washer configured to clean the decarbonated combustion exhaust gas discharged from the second washer by using third cleaning liquid to capture the amine entrained by the combustion exhaust gas; and
   a second bypass line through which part of the third cleaning liquid is mixed into the second cleaning liquid.

6. A method of operating a carbon dioxide capture system, the method comprising:
   causing carbon dioxide contained in combustion exhaust gas to be absorbed by absorbing liquid containing amine in a carbon dioxide capturer to produce a decarbonated combustion exhaust gas;
   cleaning the decarbonated combustion exhaust gas discharged from the carbon dioxide capturer by spraying a first cleaning liquid, with a spray provided to a first washer, supplied under first pressure in the first washer to capture the amine entrained by the combustion exhaust gas; and
   cleaning the decarbonated combustion exhaust gas discharged from the first washer by diffusing and dropping a second cleaning liquid, with a cleaning liquid diffuser provided to a second washer, supplied under second pressure lower than the first pressure in the second washer to capture the amine entrained by the combustion exhaust gas, wherein a receiver configured to receive the first cleaning liquid sprayed by the spray is provided below the spray of the first washer, a capture space in which the first cleaning liquid sprayed by the spray is subjected to gas-liquid contact with the decarbonated combustion exhaust gas while freely falling is provided between the spray and the receiver, the first cleaning liquid having passed through the capture space is directly received by the receiver, the capture space extends from the spray to the receiver, and the capture space includes no structure having a surface that the first cleaning liquid flows down.

* * * * *